(12) United States Patent
Tsuchida

(10) Patent No.: US 8,792,133 B2
(45) Date of Patent: Jul. 29, 2014

(54) RENDERING DATA PROCESSING APPARATUS, RENDERING DATA PROCESSING METHOD, PRINT APPARATUS, PRINT METHOD, AND COMPUTER-READABLE MEDIUM

(71) Applicant: Canon Kabushiki Kaisha, Tokyo (JP)

(72) Inventor: Taro Tsuchida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 108 days.

(21) Appl. No.: 13/670,179

(22) Filed: Nov. 6, 2012

(65) Prior Publication Data

US 2013/0148136 A1  Jun. 13, 2013

(30) Foreign Application Priority Data

Dec. 8, 2011 (JP) .................... 2011-269399

(51) Int. Cl.
| | |
|---|---|
| *G06F 15/00* | (2006.01) |
| *G06K 1/00* | (2006.01) |
| *H04N 1/60* | (2006.01) |
| *G06K 15/02* | (2006.01) |
| *H04N 1/40* | (2006.01) |

(52) U.S. Cl.
CPC ........ G06K 15/1852 (2013.01); G06K 15/1855 (2013.01); *H04N 1/40062* (2013.01)
USPC ........................................... 358/1.9; 358/2.1

(58) Field of Classification Search
CPC ................. G06K 15/1852; G06K 15/1855; H04N 1/40062
USPC ............................ 358/1.1, 2.1, 1.9
See application file for complete search history.

(56) References Cited

U.S. PATENT DOCUMENTS

| 8,368,959 B2 * | 2/2013 | Stevens ......................... 358/3.06 |
| 2010/0315431 A1 * | 12/2010 | Smith et al. ................... 345/619 |

FOREIGN PATENT DOCUMENTS

JP   2000-222152 A   8/2000

* cited by examiner

*Primary Examiner* — Douglas Tran
(74) *Attorney, Agent, or Firm* — Fitzpatrick, Cella, Harper & Scinto

(57) ABSTRACT

A rendering data processing apparatus comprises: a determination unit configured to determine objects of a bitmap pattern in rendering data; a specification unit configured to specify an object, for which a bitmap rendering command can be replaced with a graphic rendering command, among the determined objects of the bitmap pattern; a replacement unit configured to replace the bitmap rendering command for the object specified by the specification unit with the graphic rendering command; and a combination unit configured, in a case where a plurality of patterns designated by a plurality of graphic rendering commands replaced by the replacement unit are arranged adjacent to each other and rendered, to combine the plurality of graphic rendering commands corresponding to the plurality of patterns with each other.

13 Claims, 26 Drawing Sheets

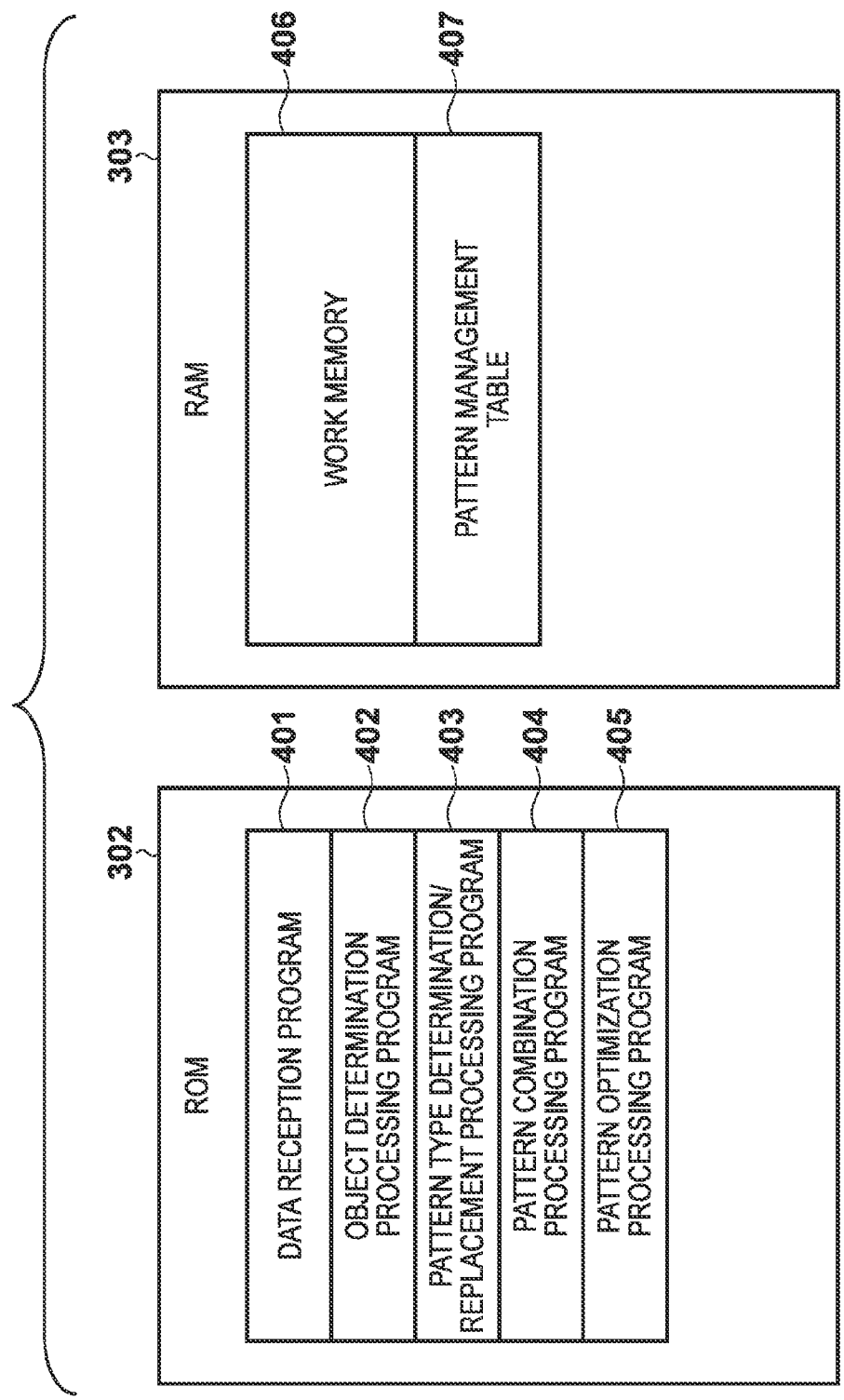

FIG. 6

- PATTERN WIDTH: 8
- PATTERN HEIGHT: 8
- PATTERN DATA:
 00001111
 00001111
 00001111
 00001111
 11110000
 11110000
 11110000
 11110000
- PATTERN SELECTION
- COORDINATE MOVEMENT (x, y)
- RECTANGLE FILLING: 100 (WIDTH) /50 (HEIGHT)

RELATIONSHIP BETWEEN
PATTERN RENDERING COMMAND AND PATTERN

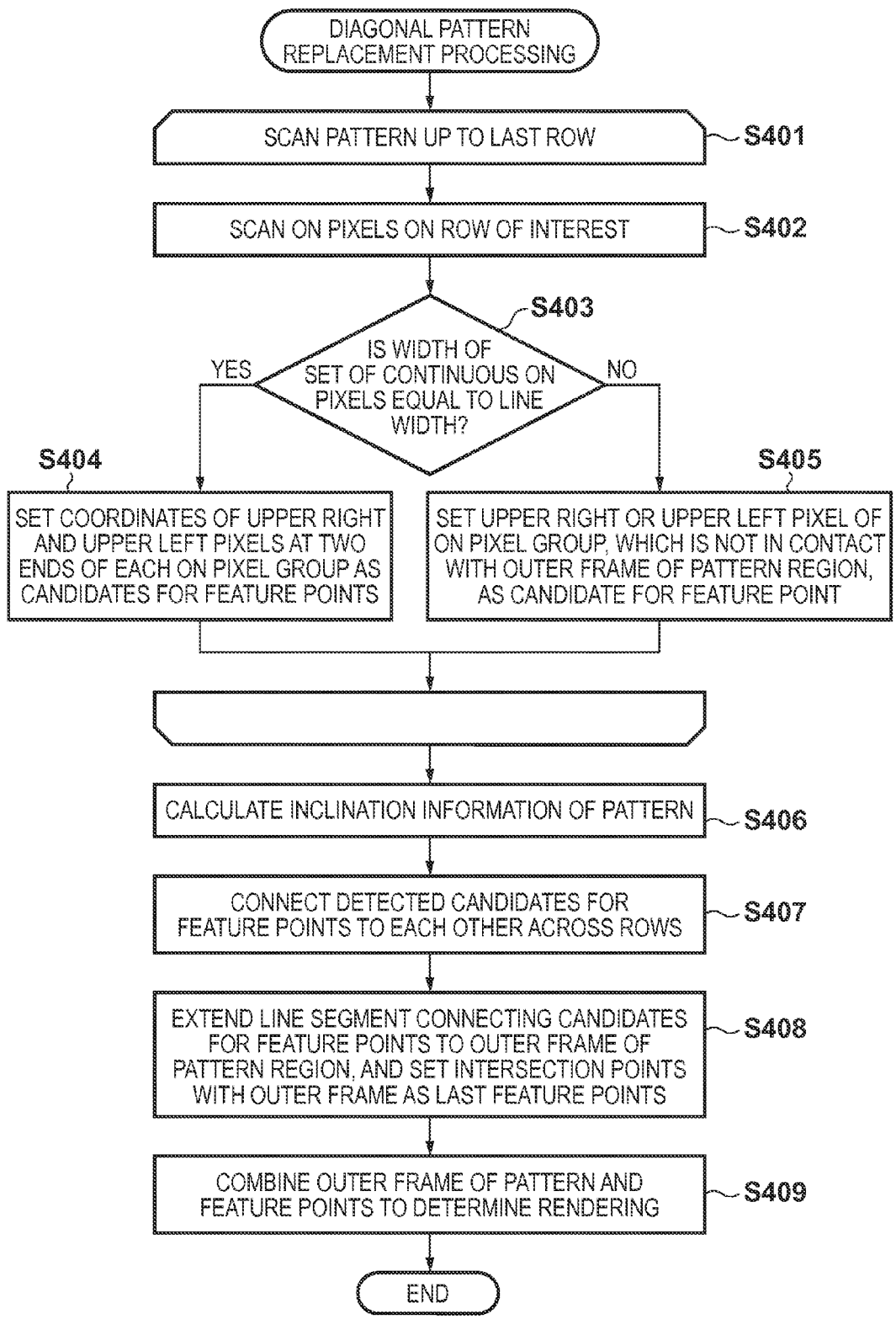
F I G. 12

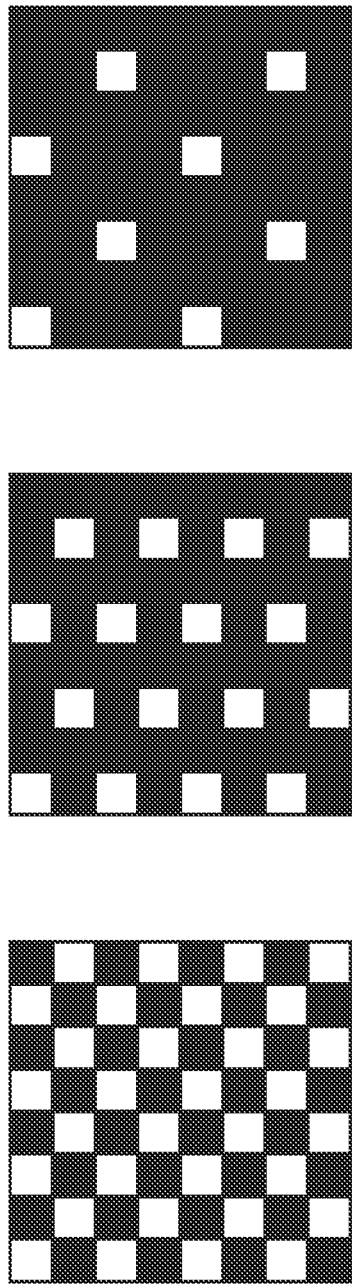

ON PIXEL=2
OFF PIXEL=6

ON PIXEL=4
OFF PIXEL=4

(1) SCANNING OF PATTERN UP TO LAST ROW
(2) SCANNING OF ON PIXELS ON ROW OF INTEREST

DETECTION OF CANDIDATES FOR FEATURE POINTS ON EACH ROW

CONNECTION OF CANDIDATES FOR FEATURE POINTS

EXTENSION OF LINE SEGMENTS TO BE IN CONTACT WITH PATTERN REGION

FINALLY DETERMINED FEATURE POINTS

RENDERING DETERMINED AS PATTERN

F I G. 22A
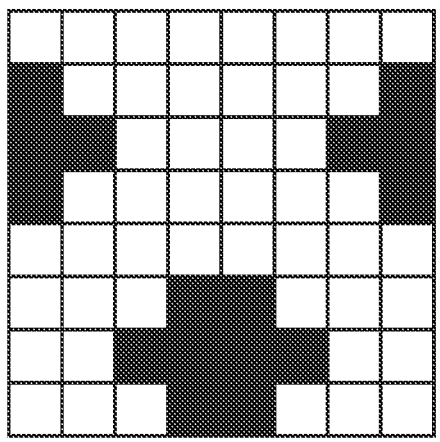
F I G. 22B
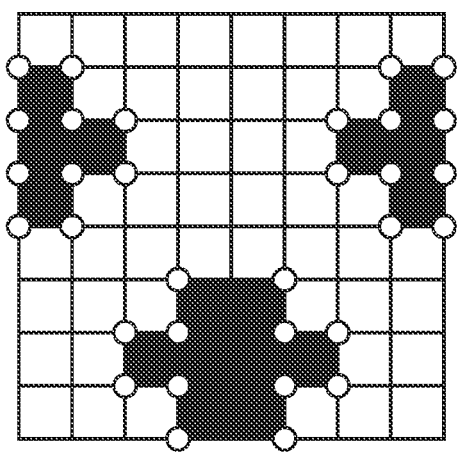
PATH REPLACEMENT:
DETECTION OF FEATURE POINTS
F I G. 22C
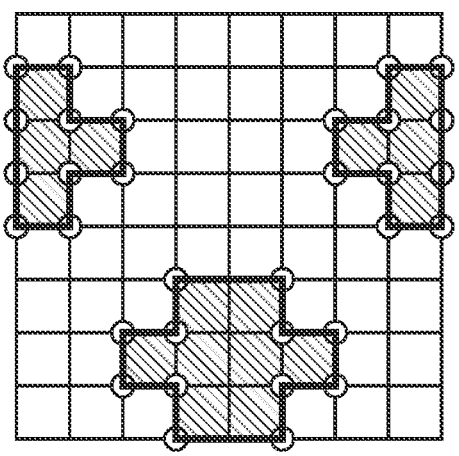
PATH REPLACEMENT:
DETERMINATION OF RENDERING

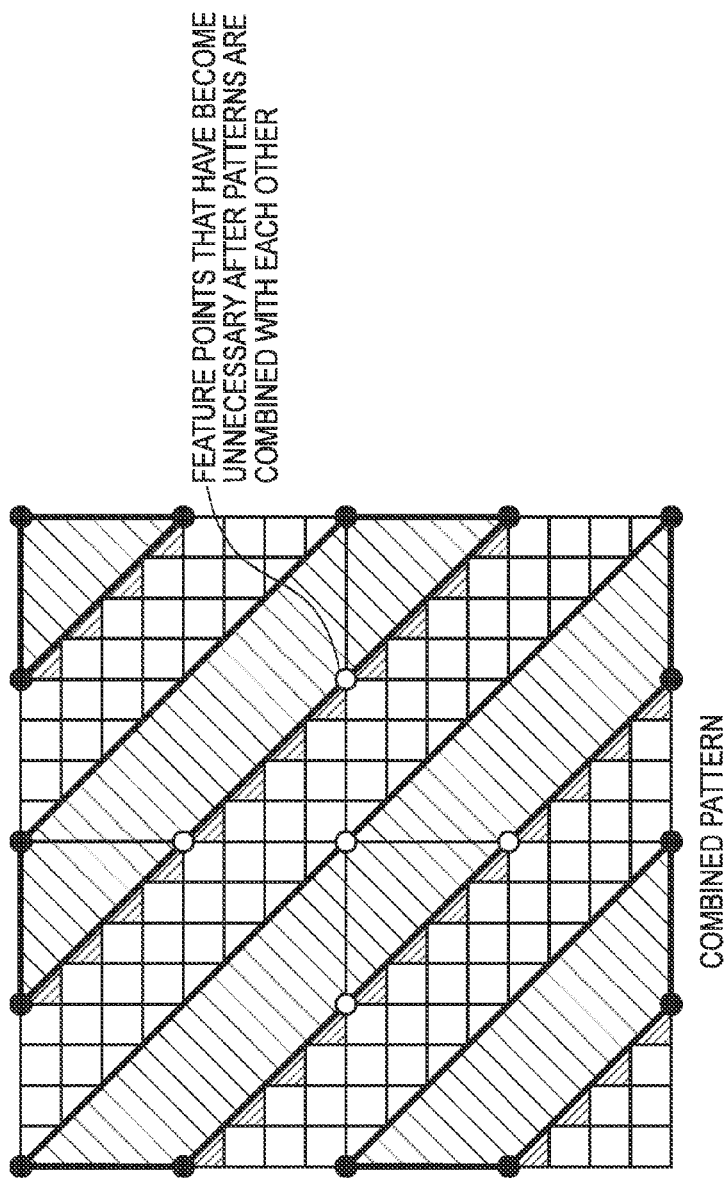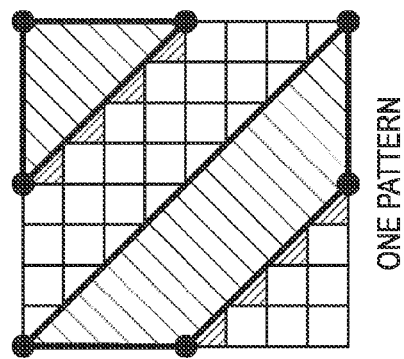

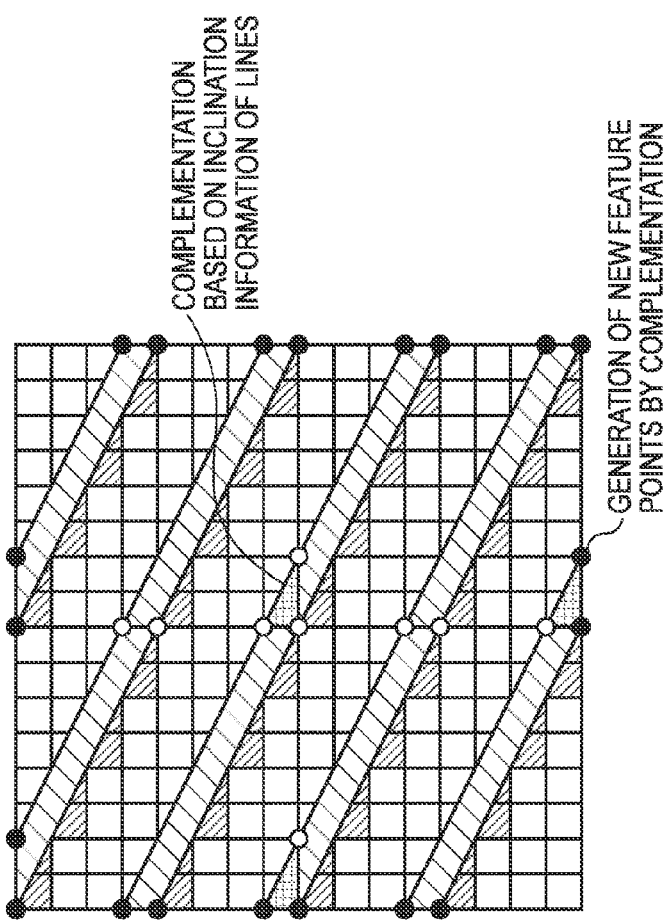
F I G. 24C
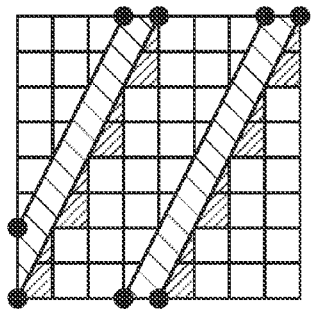
F I G. 24B
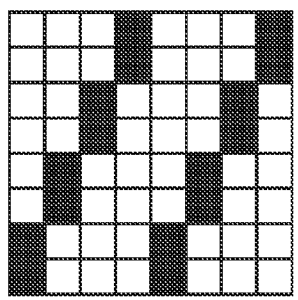
F I G. 24A

RENDERING DATA PROCESSING APPARATUS, RENDERING DATA PROCESSING METHOD, PRINT APPARATUS, PRINT METHOD, AND COMPUTER-READABLE MEDIUM

BACKGROUND OF THE INVENTION

1. Field of the Invention

The present invention relates to a rendering data processing apparatus, a rendering data processing method, a print apparatus, a print method, and a computer-readable medium. The present invention relates, more particularly, to processing for ensuring a given consistency in output of a display device and a print device having an output resolution different from that of the display device in bitmap pattern rendering processing in the print device.

2. Description of the Related Art

When office document data includes data that represents a pattern, the display result of the data presented on a monitor is often different from the result obtained by printing the data by a printer. For example, rendering data corresponding to the resolution of each of a monitor and a printer is generated using the pattern data in accordance with the difference between the display resolution of the monitor and the print resolution of the printer. This is done because a low-resolution monitor outputs a low-quality pattern, and a high-resolution printer outputs a high-quality pattern.

To improve such a difference in output resolution, processing of rendering a predetermined pattern by scaling the pattern data based on the screen output resolution and the print resolution has conventionally been performed as a technique for matching the appearances of the screen output and print output free from any distortion and moire (for example, Japanese Patent Laid-Open No. 2000-222152).

However, when the pattern data is simply scaled to remove the difference in resolution, a challenge is posed in rendering the joints of patterns due to quantization errors, so the pattern data is scaled by an integer multiple. Hence, perfect appearance matching still cannot be attained.

SUMMARY OF THE INVENTION

The present invention has been made in consideration of the above-mentioned related art technique, and allows scaling processing corresponding to the difference between the display resolution and the print resolution while maintaining a given print quality by replacing a bitmap rendering command with a graphic rendering command.

According to one aspect of the present invention, there is provided a rendering data processing apparatus comprising: a determination unit configured to determine objects of a bitmap pattern in rendering data; a specification unit configured to specify an object, for which a bitmap rendering command can be replaced with a graphic rendering command, among the determined objects of the bitmap pattern; a replacement unit configured to replace the bitmap rendering command for the object specified by the specification unit with the graphic rendering command; and a combination unit configured, in a case where a plurality of patterns designated by a plurality of graphic rendering commands replaced by the replacement unit are arranged adjacent to each other and rendered, to combine the plurality of graphic rendering commands corresponding to the plurality of patterns with each other.

According to another aspect of the present invention, there is provided a rendering data processing method comprising: determining objects of a bitmap pattern in rendering data; specifying an object, for which a bitmap rendering command can be replaced with a graphic rendering command, among the determined objects of the bitmap pattern; replacing the bitmap rendering command for the object specified in the specification step with the graphic rendering command; and combining, in a case where a plurality of patterns designated by a plurality of graphic rendering commands replaced in the replacement step are arranged adjacent to each other and rendered, the plurality of graphic rendering commands corresponding to the plurality of patterns with each other.

According to another aspect of the present invention, there is provided a non-transitory computer-readable medium storing a program for causing a computer to function as: a determination unit configured to determine objects of a bitmap pattern in rendering data; a specification unit configured to specify an object, for which a bitmap rendering command can be replaced with a graphic rendering command, among the determined objects of the bitmap pattern; a replacement unit configured to replace the bitmap rendering command for the object specified by the specification unit with the graphic rendering command; and a combination unit configured, in a case where a plurality of patterns designated by a plurality of graphic rendering commands replaced by the replacement unit are arranged adjacent to each other and rendered, to combine the plurality of graphic rendering commands corresponding to the plurality of patterns with each other.

According to another aspect of the present invention, there is provided a print apparatus comprising: a first determination unit configured to determine whether a rendering command included in print data is a pattern rendering command; a second determination unit configured to determine a type of bitmap pattern, corresponding to the pattern rendering command, for the rendering command determined as the pattern rendering command by the first determination unit; a processing unit configured to replace the bitmap pattern with a graphic rendering command for the pattern rendering command if the second determination unit determines that the bitmap pattern is not a density pattern, and not to replace the bitmap pattern with a graphic rendering command for the pattern rendering command if the second determination unit determines that the bitmap pattern is a density pattern; and a print unit configured to print the print data in accordance with the pattern rendering command processed by the processing unit.

According to another aspect of the present invention, there is provided a print method comprising: a first determination step of determining whether a rendering command included in print data is a pattern rendering command; a second determination step of determining a type of bitmap pattern, corresponding to the pattern rendering command, for the rendering command determined as the pattern rendering command in the first determination step; a processing step of replacing the bitmap pattern with a graphic rendering command for the pattern rendering command if it is determined in the second determination step that the bitmap pattern is not a density pattern, and not replacing the bitmap pattern with a graphic rendering command for the pattern rendering command if it is determined in the second determination step that the bitmap pattern is a density pattern; and a print step of printing the print data in accordance with the pattern rendering command processed in the processing step.

According to the present invention, even for print data rendered using a bitmap pattern, it is possible to match the appearances of the display result presented on a monitor having a resolution different from that of a print device, and the output result obtained by the print device, and to obtain an output result with a higher quality.

Further features of the present invention will become apparent from the following description of exemplary embodiments with reference to the attached drawings.

BRIEF DESCRIPTION OF THE DRAWINGS

FIG. 4 is a view illustrating an example of the contents of a ROM/RAM;

FIG. 6 is a view illustrating an example of a pattern rendering command;

FIG. 12 is a flowchart of diagonal pattern replacement processing;

FIGS. 17A, 17B, and 17C are views illustrating examples of density patterns;

FIGS. 22A, 22B, and 22C are views for explaining patterns obtained in respective steps of path replacement processing;

FIGS. 23A and 23B are views for explaining patterns obtained in diagonal pattern combination processing;

FIGS. 24A, 24B, and 24C are views for explaining pattern complementation in diagonal pattern combination processing;

DESCRIPTION OF THE EMBODIMENTS

Modes for carrying out the present invention will be described below with reference to the accompanying drawings.

[Configuration of Entire System]

Figure 1:
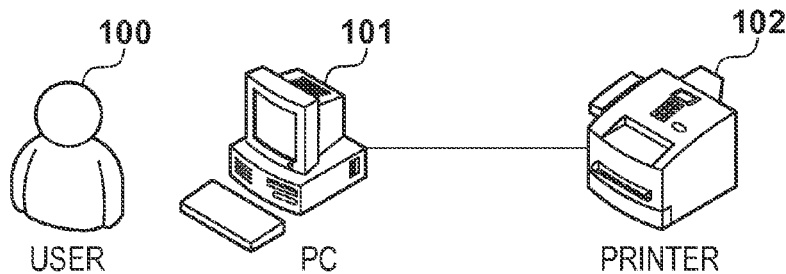
FIG. 1 is a view illustrating an example of the configuration of the entire system.

FIG. 1 is a view showing the entire print system including a user 100, a personal computer (to be abbreviated as a PC hereinafter) 101 used by the user 100, and a printer 102 communicably connected to the PC 101. In the print system shown in FIG. 1, the user 100 refers to print data on an application running on the PC 101 to issue a print instruction. The printer 102 prints the print data in accordance with the print instruction from the user 100. Although the PC 101 and the printer 102 are directly connected to each other in FIG. 1, the present invention is not limited to this configuration. For example, the print system may include a plurality of sets of PCs and printers. Also, the network which connects the PC and the printer to each other may be an intranet such as a LAN, or an external network such as the Internet. Moreover, the connection scheme is not particularly limited to either wired or wireless connection.

Note that the printer 102 may be, for example, an MFP (MultiFunction Peripheral) having a print function.

[Personal Computer]

Figure 2:
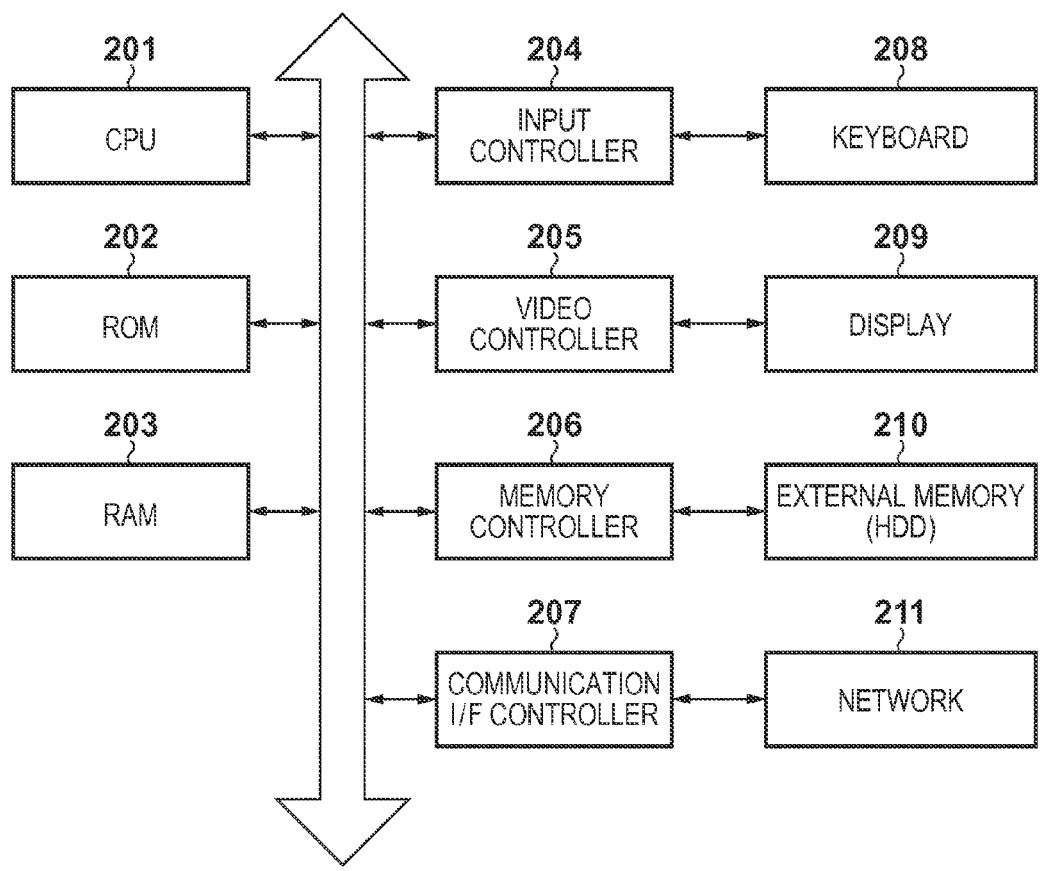
FIG. 2 is a block diagram illustrating an example of the hardware configuration of a PC.

FIG. 2 is a block diagram of the PC 101 according to this embodiment. A CPU 201 performs various types of control of the PC 101. A ROM 202 stores program codes for, for example, startup processing. A RAM 203 is used when an operating system and various applications are executed by the CPU 201, for example, is used as work areas for the various applications.

An input controller 204 controls an input device. In this case, as an example of the input device, a keyboard 208 is connected to the input controller 204 to accept various types input processing by the user. A video controller 205 performs display control. In this case, a display 209 is connected to the video controller 205 to perform display control corresponding to the resolution information of the display 209. A memory controller 206 controls an external memory. In this case, as an external memory 210, an HDD is connected to the memory controller 206, and stores, for example, application programs and document data.

A communication I/F controller 207 is a communication control module. In this case, a network 211 is connected to the communication I/F controller 207 to communicate with an external device. The network 211 in this case corresponds to, for example, a LAN or the Internet.

[Printer]

Figure 3:
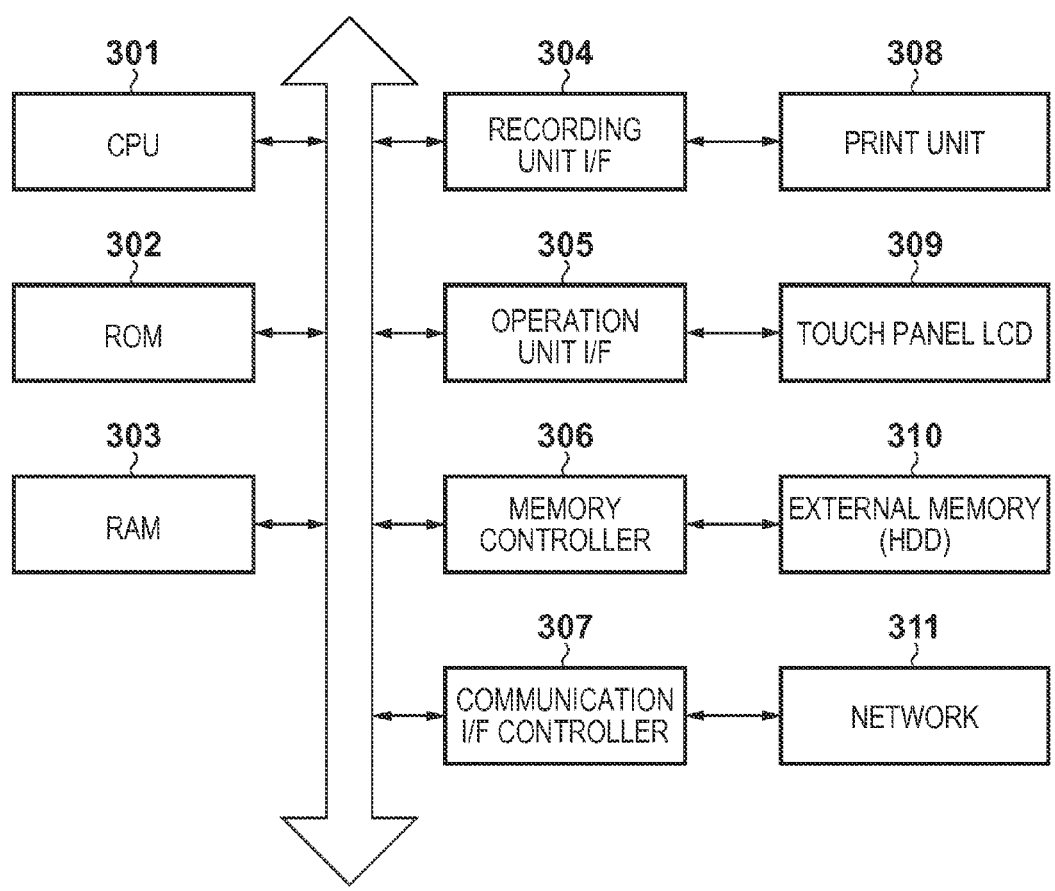
FIG. 3 is a block diagram illustrating an example of the hardware configuration of a multifunction peripheral.

FIG. 3 is a block diagram of the printer 102 serving as a rendering data processing apparatus according to this embodiment. A CPU 301 performs various types of control of the printer 102. A ROM 302 stores various control programs to be executed by the CPU 301. A RAM 303 includes a work area and nonvolatile area into which programs for various types of control by the CPU 301 are expanded, and stores print settings and various parameters.

A recording unit I/F 304 is a module which performs recording control. In this case, the recording unit I/F 304 is connected to a print unit 308, and outputs print data to the print unit 308 or performs paper control for the print unit 308. An operation unit I/F 305 is a module which controls an operation unit. In this case, the operation unit I/F 305 is connected to a touch panel LCD (Liquid Crystal Display) 309. The operation unit I/F 305 displays menus, settings, and various statuses via the touch panel LCD 309, and accepts input from the operator.

A memory controller 306 controls an external memory 310. In this case, as the external memory 310, an HDD is connected to the memory controller 306, and stores, for example, document data and the information of various histories. A communication I/F controller 307 is a communication control module. In this case, a network 311 is connected to the communication I/F controller 307 to communicate with an external device. The network 311 in this case corresponds to a LAN or the Internet.

[Monitor Resolution Obtaining, Print Data Generation, and Transmission Processing]

Figure 5B:
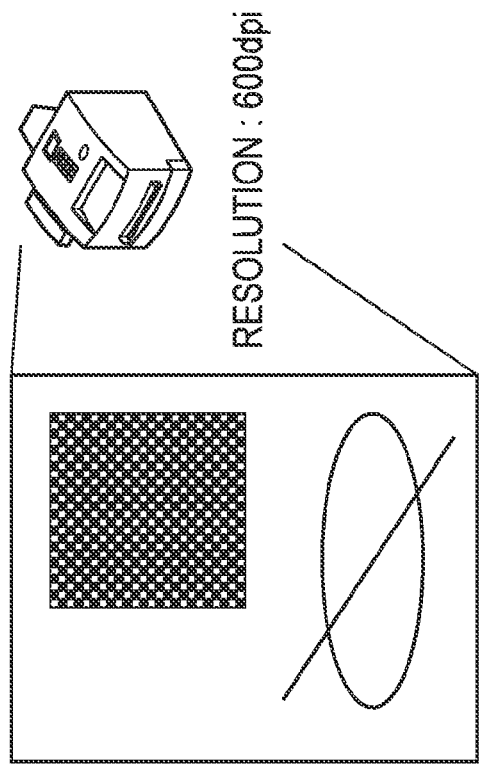
FIGS. 5A and 5B are views illustrating practical examples of a monitor output result and a printer output result, respectively.

A monitor display result and print data generation processing will be described first with reference to FIGS. 1 and 5A and 5B.

Application software (to be simply referred to as an "application" hereinafter) and an operating system (to be abbreviated as an "OS" hereinafter) for operating this software are running on the PC 101 shown in FIG. 1. On, for example, the Windows® OS, this application performs rendering using a GDI (Graphic Device Interface) serving as a graphic library provided by the Windows® OS.

The GDI performs output control for each device used to output predetermined data in accordance with the device capacity. In output control based on, for example, the resolution, a plurality of data having different output resolutions are generated for different output destinations. Hence, upon rendering that uses the GDI to output a bitmap pattern (to be simply referred to as a "pattern" hereinafter) included in print data from the application, a plurality of data having different pattern resolutions are generated for monitor display and printer output. Note that practical examples of patterns processed in the present invention will be described later.

Figure 5A:
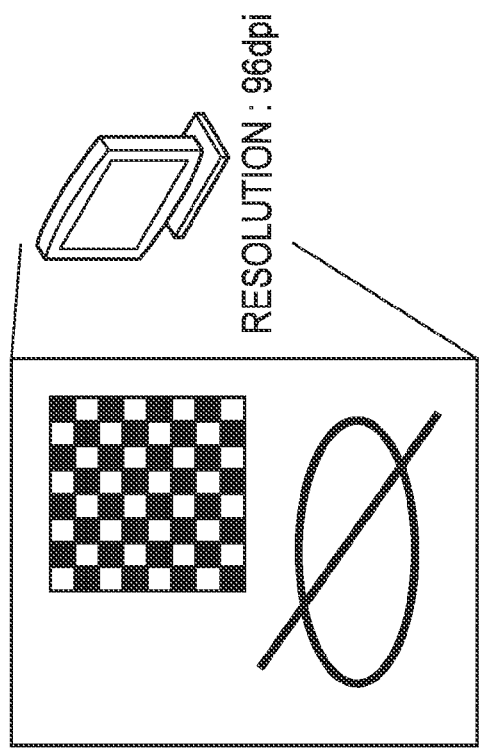

More specifically, as shown in FIG. 5A, when the monitor resolution is 96 dpi (dot per inch), pattern data generated for monitor display by a monitor driver (not shown) has 96 dpi. On the other hand, in print data generation by a printer driver (not shown), print data is generated in accordance with the resolution information (600 dpi in this case) set by the printer driver, as shown in FIG. 5B. Also, this print data includes various rendering commands and print control commands called a PDL (Page Description Language).

In this case, when the user 100 issues a print instruction while referring to document data displayed on the monitor (display 209) of the PC 101, the PC 101 transmits print data including information indicating that the resolution information of this monitor is 96 dpi to the printer 102.

Processing in the printer 102 shown in FIG. 1 will be described in detail below with reference to FIGS. 3, 4, and 6, and flowcharts shown in FIGS. 7, 8, and 11 to 16.

[Outline of Processing in Printer]

Figure 7:
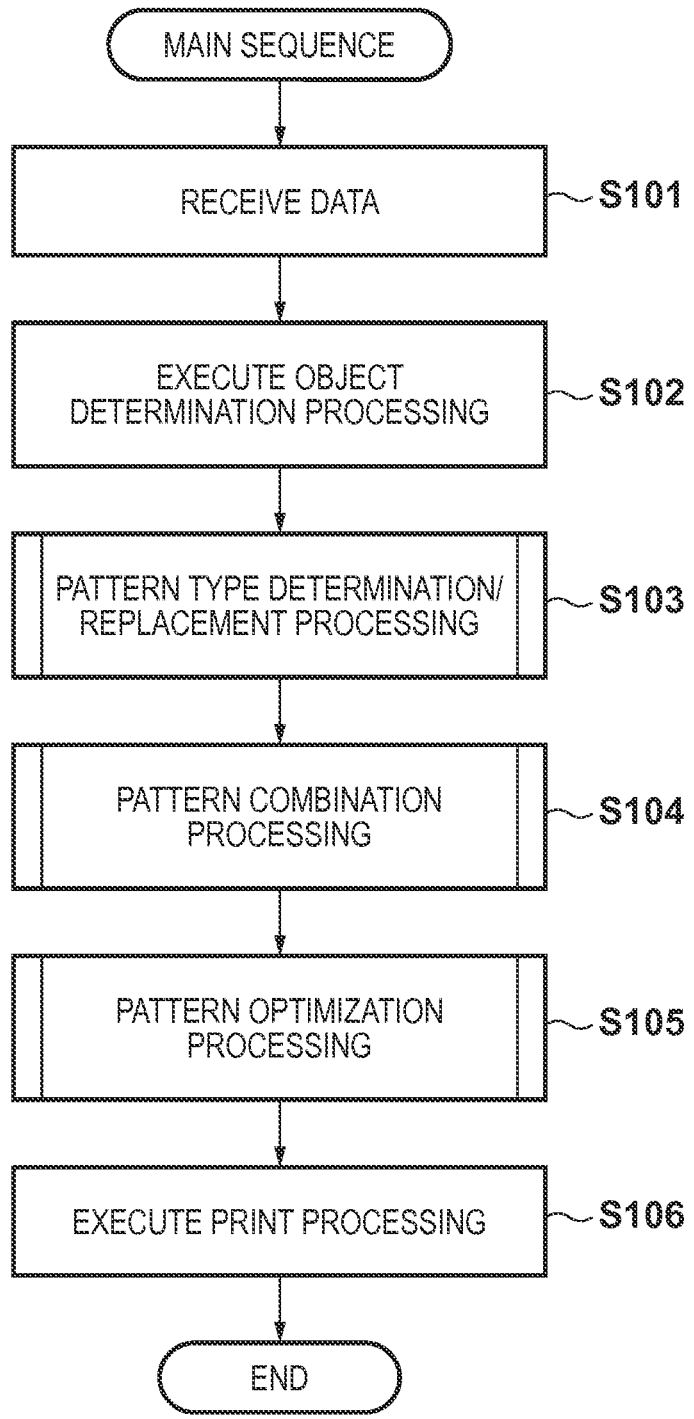
FIG. 7 is a flowchart of processing in a print apparatus.

The sequence of processing according to an embodiment of the present invention will be described with reference to a flowchart shown in FIG. 7. Note that processing programs which implement the sequence of the flowchart shown in FIG. 7 are stored in the ROM 302 of the printer 102, and implemented by reading them out into the RAM 303 and executing them by the CPU 301.

First, the printer 102 receives print data from the network 311 and holds it in the external memory 310, under the control of a data reception program 401 executed by the CPU 301 shown in FIG. 3 (step S101). The print data received at this time includes the resolution information of the monitor of the PC 101, as described above. Note that the data reception program 401 is held in the ROM 302, as shown in FIG. 4.

The CPU 301 then reads out the print data held in the external memory 310, analyzes the PDL included in the print data, and determines a rendering object by an object determination processing program 402 (step S102). After the determination processing ends, the CPU 301 executes rendering object determination processing of determining whether the rendering object is a pattern rendering object or a rendering command of, for example, a text or an image.

Since the rendering command determination processing is a technique known to those skilled in the art, a detailed description thereof will not be given. A pattern rendering command generally includes, for example, the width and height of a pattern, and pattern data, as shown in FIG. 6. Therefore, this processing is performed for each pattern with a predetermined size (within a predetermined region) in the print data. Note that the pattern rendering command is not limited to the configuration shown in FIG. 6, and may include other types of information.

For the objects determined as patterns, the CPU 301 executes pattern type determination processing, and replacement processing with a graphic rendering command such as a line rendering or rectangle rendering command (step S103). The pattern type determination processing indicates herein processing of specifying the types and features of patterns, and accumulating rendering command replacement information. The pattern type determination/replacement processing will be described in detail later with reference to FIGS. 8 and 11 to 14.

Normally, a pattern is rendered by arranging a plurality of identical images, instead of being rendered using one specific image. Hence, the CPU 301 executes pattern combination processing for generating a rendering command efficient in arranging identical patterns, in accordance with the designated rendering commands (step S104). The pattern combination processing will be described in detail later with reference to FIG. 15.

The CPU 301 determines whether the rendering efficiency will improve upon replacement of the rendering command to render the combined pattern with another rendering command, and executes pattern optimization processing for replacement with an optimum rendering command where necessary (step S105). The pattern optimization processing will be described in detail later with reference to FIG. 16.

With the above-mentioned processing, the rendering command for the rendering portion designated in the pattern is replaced with another rendering command and is rendered. Lastly, the CPU 301 transmits the converted rendering command to the print unit 308 as print data, and executes print processing (step S106).

The schematic processing sequence according to the embodiment of the present invention has been described above. Each type of processing will be described in more detail next with reference to the accompanying drawings.

[Pattern Type Determination/replacement Processing]

Figure 10:
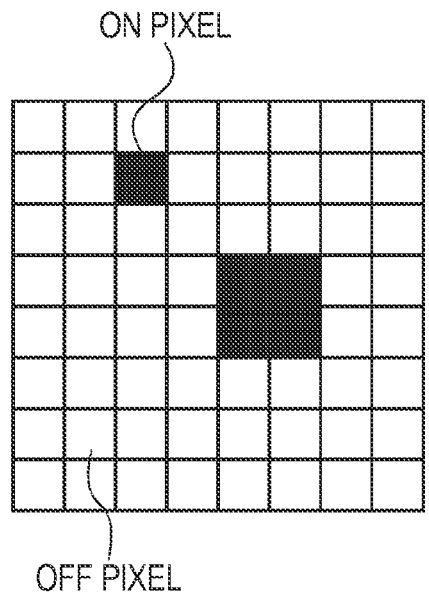
FIG. 10 is a view showing the relationship between pattern data and a rasterized pattern.

In the pattern type determination/replacement processing of step S103 in FIG. 7, the type of pattern data included in the received print data is determined. A pattern rendering command and an actual pattern have a relationship as shown in FIG. 10. Note that a pixel portion filled with a color in the pattern will be referred to as an "ON pixel" hereinafter, and a pixel portion which is not filled with the color in the pattern will be referred to as an "OFF pixel" hereinafter. Although an ON pixel is represented as "1", and an OFF pixel is represented as "0" in the pattern data of the pattern rendering command shown in FIG. 10, the present invention is not limited to this.

Figure 8:
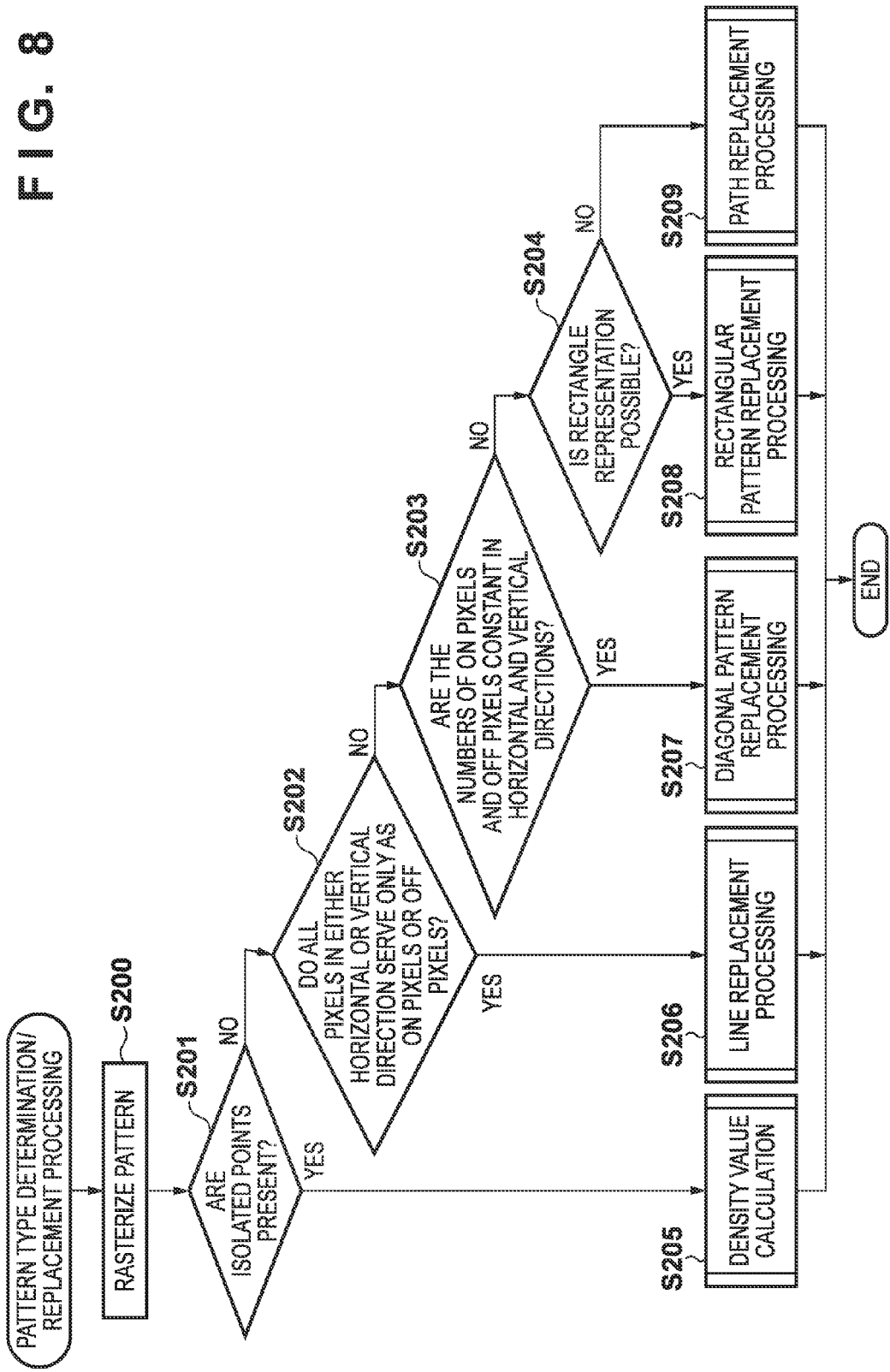
FIG. 8 is a flowchart of pattern type determination/replacement processing.
Figure 26:
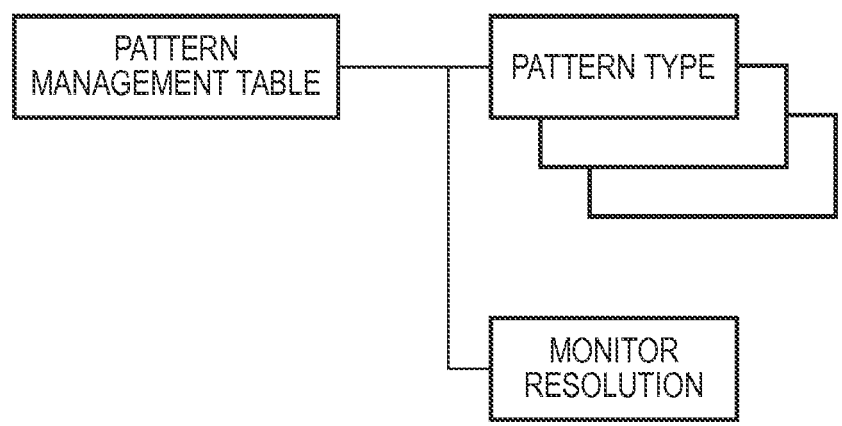
FIG. 26 is a view illustrating an example of the configuration of a pattern management table.

The pattern type determination/replacement processing will be described in detail below with reference to flowcharts shown in FIGS. 8 and 11 to 14, and FIGS. 4, 9, 17A to 17C, 18A to 18C, and 27A to 27D. Note that a pattern management table associated with the sequences of these flowcharts, and the information of a pattern type such as a density pattern, a line pattern, or a pattern representing diagonal lines (to be referred to as a diagonal pattern hereinafter) are stored in the RAM 303 of the printer 102. FIG. 26 shows the configuration of the pattern management table. FIGS. 27A to 27D illustrate examples of the configurations of the pieces of information of the respective patterns. Also, a pattern type determination/replacement processing program 403 which implements the sequence of the flowchart shown in FIG. 8 is stored in the ROM 302 of the printer 102, read out into the RAM 303, and executed by the CPU 301, as shown in FIG. 4.

Figure 9:
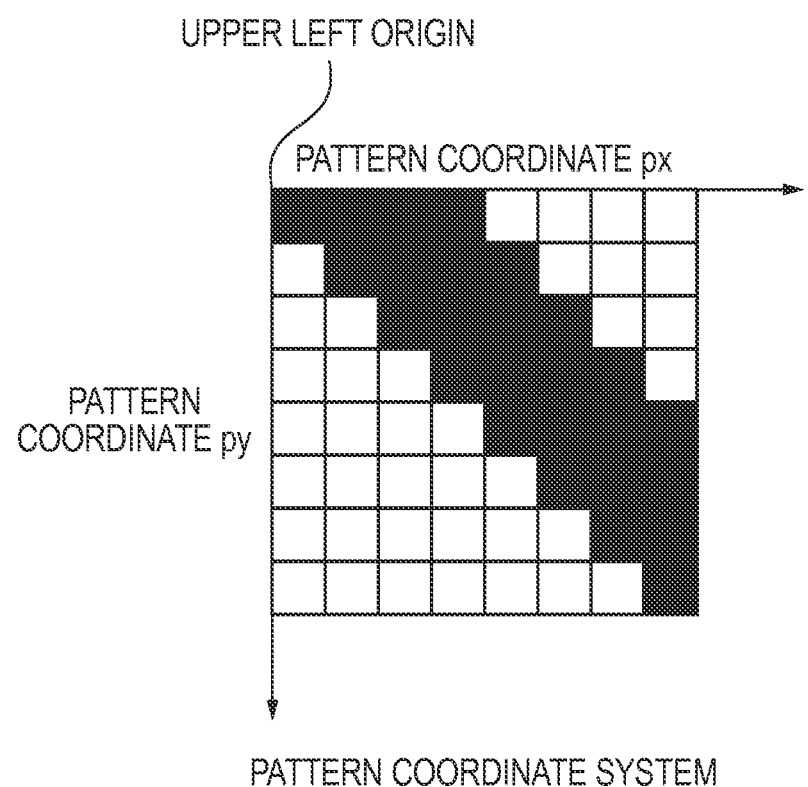
FIG. 9 is a view showing the coordinate system of pattern data.

In the printer 102, the CPU 301 rasterizes pattern data to be determined on the RAM 303 (step S200). The case wherein a pattern is rasterized on a pattern coordinate system as shown in FIG. 9 will be taken as an example herein. Referring to FIG. 9, the upper left pixel is defined as an origin, the horizontal axis is defined as an X-coordinate axis, and the vertical axis is defined as a Y-coordinate axis. Also, in this specification, a horizontally continuous pixel group will be referred to as a "row" in the rasterized pattern, and a vertically continuous pixel group will be referred to as a "column" in the rasterized pattern.

The CPU 301 determines whether the pattern data represents a uniform density (step S201). As a determination method in this case, the CPU 301 determines whether the pattern includes isolated points. Practical examples of the pattern including isolated points are patterns as shown in FIGS. 17A to 17C, which include a plurality of pixels that are neither continuous ON pixels nor continuous OFF pixels.

Figure 27A:
FIGS. 27A, 27B, 27C, and 27D are views illustrating examples of the configurations of respective patterns included in the pattern management table.

If it is determined in step S201 that the pattern includes isolated points (YES in step S201), the CPU 301 determines that this pattern is a "density pattern" representing the density at which a specific region is filled with a color, instead of the shape of this pattern. Hence, the CPU 301 calculates the density value of the pattern (step S205). The CPU 301 then ends the replacement processing of the detected pattern. In this case, as shown in FIG. 27A, information indicating a density pattern and a feature amount indicating a density value are detected as pattern feature information, and stored in a pattern management table 407 of the RAM 303 shown in FIG. 4. Since pattern data determined as density pattern data do not undergo replacement processing with a graphic rendering command (to be described later), they are directly arranged in the rasterizing area intact as pattern rendering commands included in the print data, that is, bitmap pattern data, and are printed by the print unit 308.

Figure 18A:
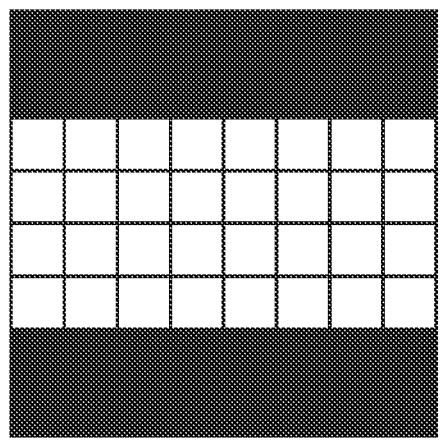
FIGS. 18A, 18B, and 18C are views illustrating examples of line patterns.
Figure 18B:
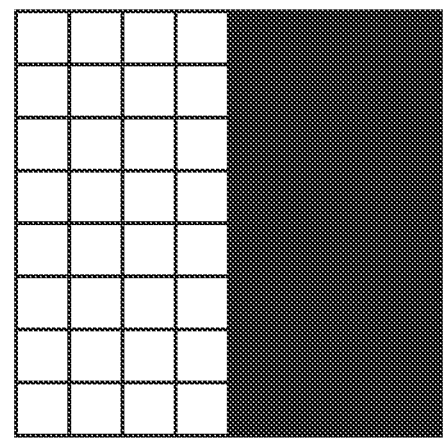

If it is determined in step S201 that the pattern includes no isolated points (NO in step S201), the CPU 301 determines a "shape" represented by the pattern. First, the CPU 301 determines whether all pixels in either the horizontal or vertical direction in the pattern serve as predetermined ON pixels or OFF pixels (step S202). More specifically, the CPU 301 horizontally and vertically scans all pixels in the pattern to determine whether all the pixels in either the horizontal or vertical direction in the pattern serve only as ON pixels or OFF pixels. Examples of the pattern which satisfies this condition are patterns as shown in FIGS. 18A and 18B.

If all the pixels in either the horizontal or vertical direction in the pattern serve only as ON pixels or OFF pixels (YES in step S202), the CPU 301 determines that replacement with a line rendering command is possible, and executes line replacement processing (step S206). This indicates that the CPU 301 determines whether all pixels on either a row or a column in the pattern serve only as identical pixels. The line replacement processing will be described in detail later with reference to FIG. 11. Note that the CPU 301 holds the direction, which is determined to have a bitmap rendering command that can be replaced with a line rendering command in the determination processing of step S202, in a work memory 406 within the RAM 303 shown in FIG. 4 as "direction" information indicating the line direction. After the line replacement processing is completed, this processing sequence ends.

Figure 19B:
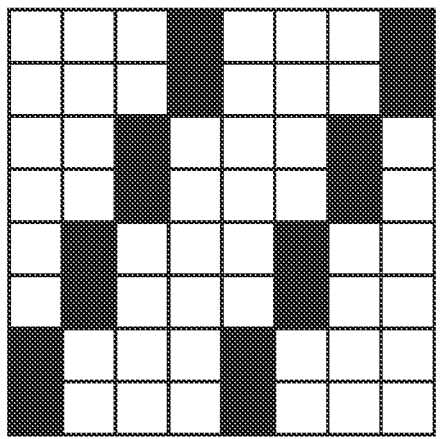
FIGS. 19A and 19B are views illustrating examples of diagonal patterns.
Figure 19A:
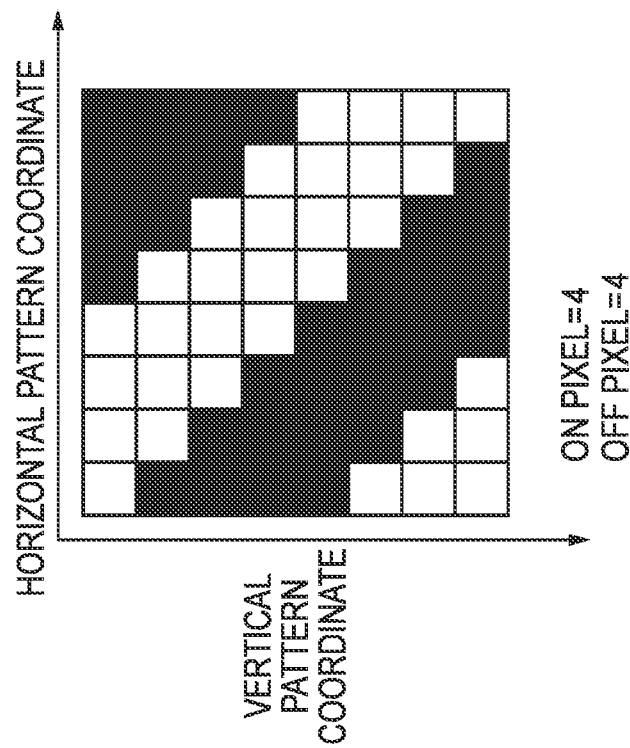

If NO is determined in step S202, the CPU 301 determines whether the pattern represents a shape defined by diagonal lines (step S203). More specifically, the CPU 301 horizontally and vertically scans the rasterized pattern to determine whether the numbers of ON pixels and OFF pixels are constant in the horizontal or vertical direction. FIGS. 19A and 19B illustrate practical examples of diagonal patterns, in which the numbers of ON pixels and OFF pixels are constant in the horizontal and vertical directions. As can be seen from, for example, FIG. 19A, four OFF pixels and four ON pixels are arranged as constant numbers of ON pixels and OFF pixels (have a given periodicity).

If it is determined in step S203 that the numbers of ON pixels and OFF pixels are constant (YES in step S203), the CPU 301 executes diagonal pattern replacement processing (step S207). The diagonal pattern replacement processing will be described in detail with reference to FIG. 12. Note that the CPU 301 holds a value, which is obtained by dividing the total number of ON pixels on one row by the number of sets of continuous ON pixels (to be referred to as ON pixel groups hereinafter) on one row, in the work memory 406 within the RAM 303 shown in FIG. 4 as "line width" information. In the case of, for example, FIG. 19A, the line width is 4 (=4 (the total number of ON pixels)/1 (the number of ON pixel groups)). Similarly, in the case of FIG. 19B, the line width is 2. After the diagonal pattern replacement processing is completed, this processing sequence ends.

If it is determined in step S203 that the numbers of ON pixels and OFF pixels are not constant (NO in step S203), the CPU 301 executes rectangle determination processing (step S204). The rectangle determination processing indicates herein processing of determining whether the pattern rendering data is represented by simple figures such as quadrangles instead of complex figures.

Figure 21A:
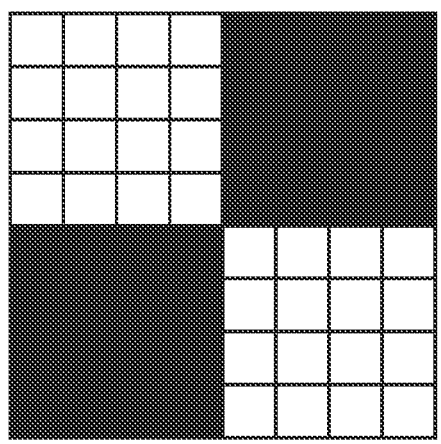
FIGS. 21A, 21B, and 21C are views for explaining examples of patterns associated with rectangular pattern replacement.
Figure 21B:
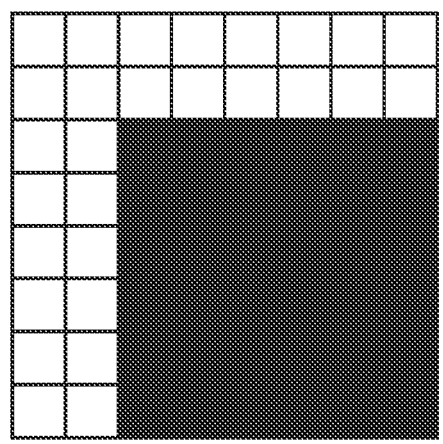
Figure 21C:
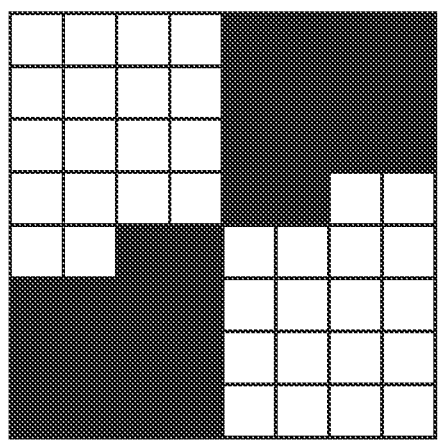

More specifically, when a row in the pattern is scanned and a portion having continuous ON pixels is present, the left and right pixels of the ON pixel group are held as feature points. The scanning sequence then shifts to the next row. When an ON pixel group having the same width is present at the same position, the scanning sequence further shifts to the next row. When identical ON pixel groups are present across different rows, it is determined that the pattern rendering data can be represented by rectangles. FIGS. 21A and 21B illustrate practical examples of pattern rendering data determined to be represented by rectangles in step S204. On the other hand, FIG. 21C illustrates a practical example of pattern rendering data which is not determined to be represented by rectangles in step S204.

If it is determined in the rectangle determination processing of step S204 that the pattern rendering data can be represented by rectangles (YES in step S204), the CPU 301 executes rectangular pattern replacement processing. The rectangular pattern replacement processing will be described later with reference to FIG. 13. After the rectangular pattern replacement processing is completed, this processing sequence ends.

If it is determined in the rectangle determination processing of step S204 that the pattern rendering data cannot be represented by rectangles (NO in step S204), the CPU 301 executes path replacement processing of directly replacing the pattern with a rendering command that designates path rendering. The path replacement processing will be described in detail later with reference to FIG. 14. After the path replacement processing is completed, this processing sequence ends.

Each type of replacement processing shown in FIG. 8 will be described in more detail below.

(Line Replacement Processing)

Figure 11:
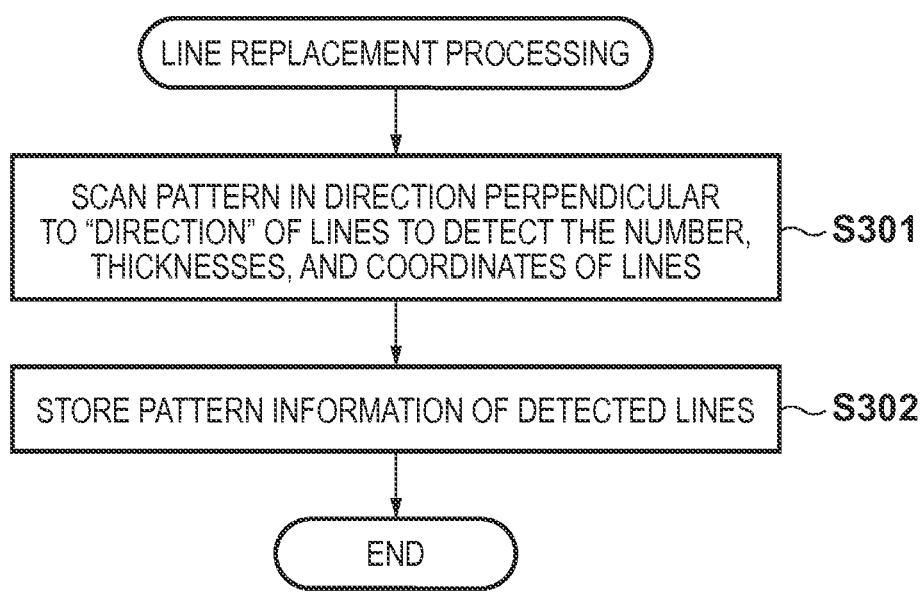
FIG. 11 is a flowchart of line replacement processing.
Figure 18C:
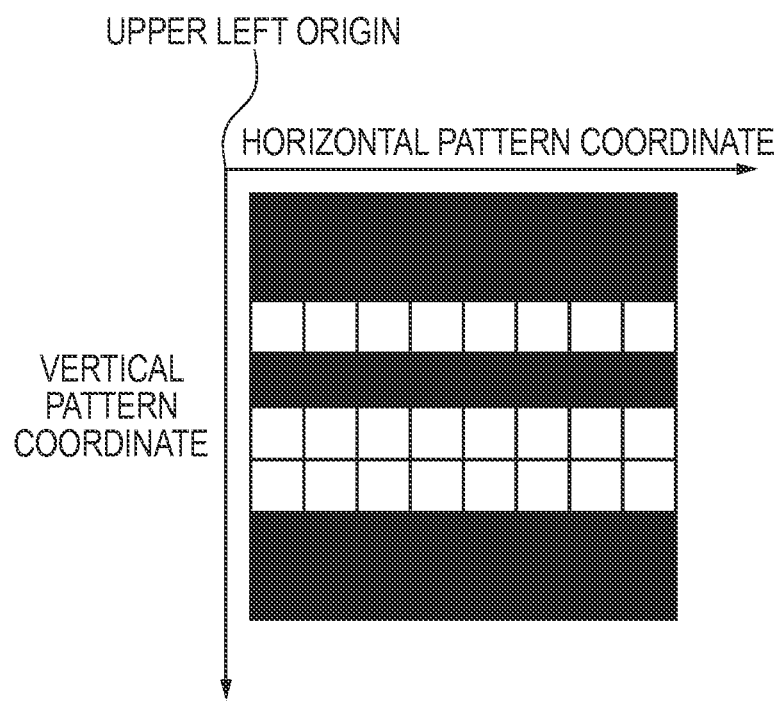
Figure 27B:
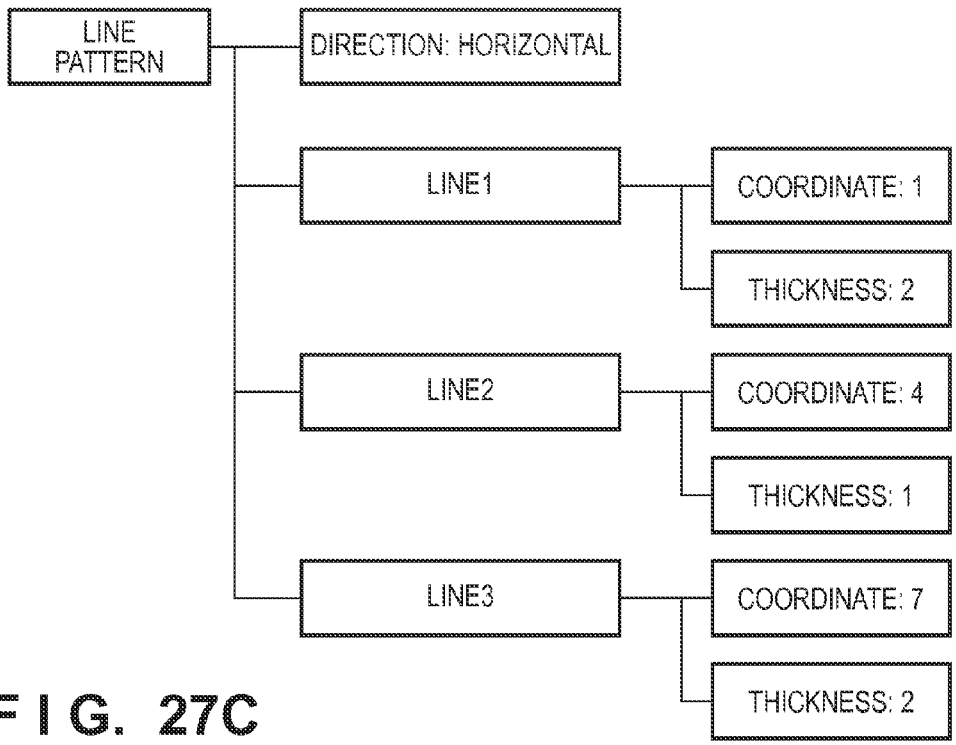

The line replacement processing in step S206 of FIG. 8 will be described in detail below with reference to a flowchart shown in FIG. 11. The CPU 301 scans the pattern in a direction perpendicular to the "direction" based on the "direction" information of the line pattern which has previously been detected and held in the work memory 406, thereby detecting the number, thicknesses, and coordinates of lines (step S301). More specifically, in the case of a pattern as shown in FIG. 18C, line pattern information corresponding to a rendering command as shown in FIG. 27B is detected.

The CPU 301 stores the line pattern information detected in step S301 in the pattern management table 407 within the RAM 303 shown in FIG. 4 (step S302). Note that at this time, the "direction" information held in the work memory 406 may be deleted. This processing sequence then ends.

(Diagonal Pattern Replacement Processing)

Figure 20A:
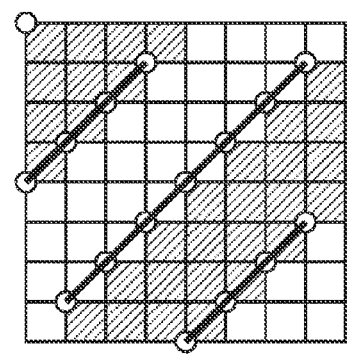
FIGS. 20A, 20B, 20C, 20D, 20E, and 20F are views for explaining patterns obtained in respective steps of diagonal pattern replacement processing.

The diagonal pattern replacement processing in step S207 of FIG. 8 will be described in detail below with reference to a flowchart shown in FIG. 12. FIGS. 20A to 20F show images in respective steps of this processing. In this case, the image shown in FIG. 20A is used as an input image.

First, the CPU 301 repeats processes in steps S402 to S405 for each row in the pattern (step S401). The CPU 301 horizontally scans ON pixels on the row of interest (step S402). When ON pixels are detected in the horizontal direction, the CPU 301 determines whether the detected set of continuous ON pixels has a width equal to the line width held in the work memory 406 (step S403).

Figure 20B:
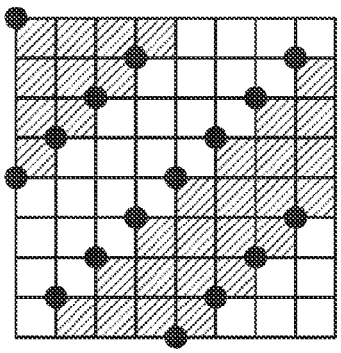

If it is determined in step S403 that the set of continuous ON pixels has a width equal to the line width (YES in step S403), the CPU 301 holds the coordinates of the upper right and upper left pixels at the two ends of each ON pixel group in the work memory 406 of the RAM 303 shown in FIG. 4 as candidates for feature points (step S404). On the other hand, if it is determined in step S403 that the set of continuous ON pixels has a width smaller than the line width (NO in step S403), the CPU 301 holds the coordinates of the upper right or upper left pixel of an ON pixel group, which is not in contact with the outer frame of the pattern region, in the work memory 406 as a candidate for a feature point (step S405). With the above-mentioned processing, information shown in FIG. 20B is obtained.

After the processes in steps S402 to S405 are completed for all rows in the pattern, the CPU 301 holds the amount of change of the endpoints of the detected ON pixel groups, which are not in contact with the outer frame of the pattern region, in the work memory 406 as the "inclination" information of the pattern (step S406).

Figure 20C:
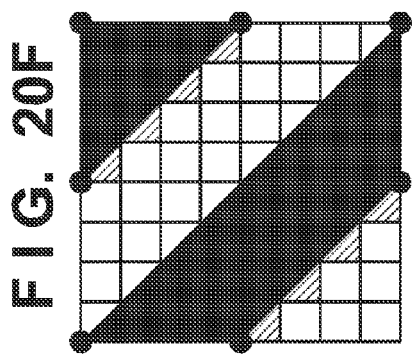
Figure 20D:
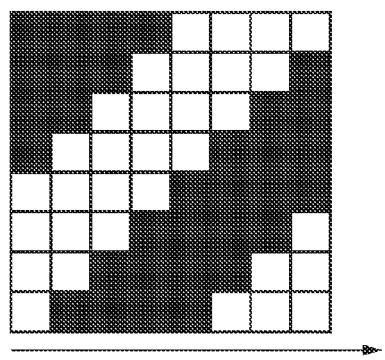
Figure 20E:
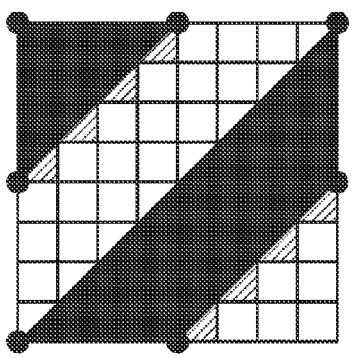
Figure 20F:
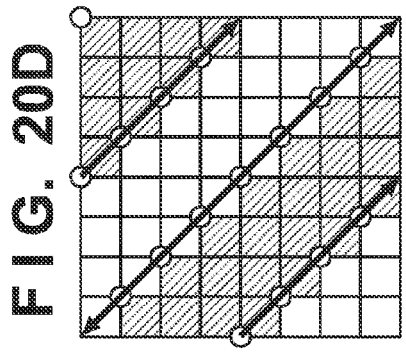

The CPU 301 connects the detected candidates for feature points to each other across rows (step S407). With the above-mentioned processing, a result shown in FIG. 20C is obtained. The CPU 301 extends the line segment connecting the candidates for feature points to the outer frame of the pattern region, sets the intersection points with the outer frame as the last feature points, and stores the processing result in the work memory 406 (step S408). With the above-mentioned processing, results shown in FIGS. 20D and 20E are obtained. Lastly, the CPU 301 connects the detected feature points to each other to determine a portion to be rendered as a pattern (step S409). Upon this operation, a pattern is determined, as shown in FIG. 20F.

Figure 27C:
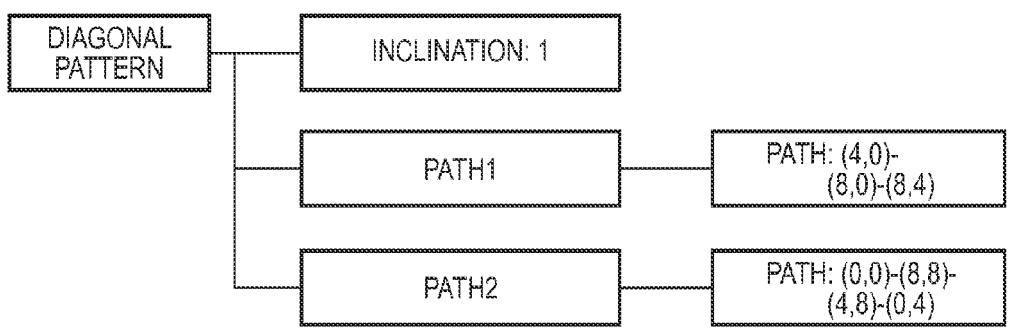

As a result of the above-mentioned processing, diagonal pattern information corresponding to a rendering command as shown in FIG. 27C is generated and stored in the pattern management table 407 shown in FIG. 4. Note that the path indicates the coordinates of feature points which constitute the pattern, that is, a closed region (object) formed by connecting the feature points to each other.

(Rectangular Pattern Replacement Processing)

Figure 13:
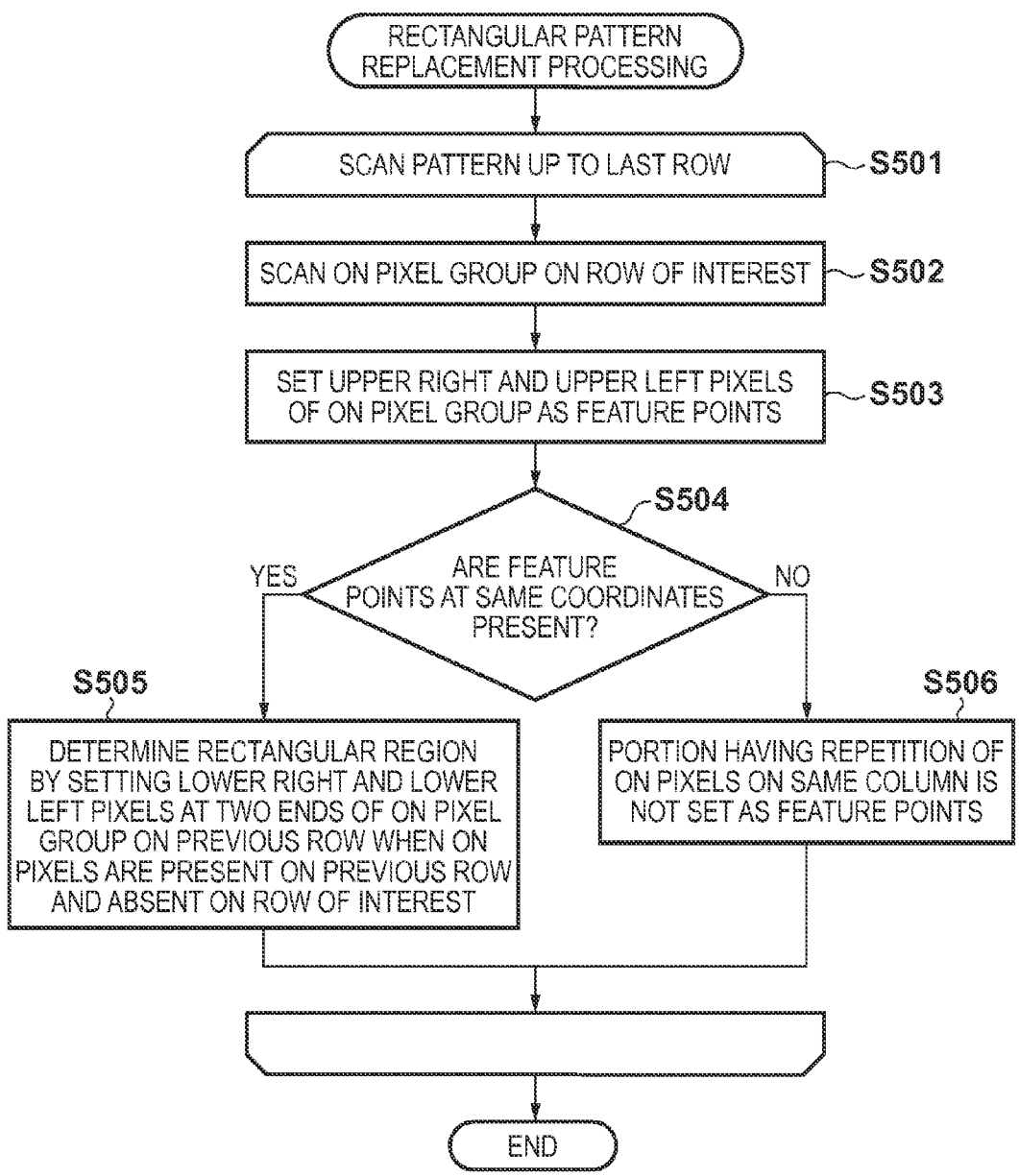
FIG. 13 is a flowchart of rectangular pattern replacement processing.

The rectangular pattern replacement processing in step S208 of FIG. 8 will be described in detail with reference to a flowchart shown in FIG. 13. FIGS. 21A to 21C illustrate examples of patterns processed in the rectangular pattern replacement processing.

The CPU 301 executes processes in steps S502 to S506 for each row in the pattern (step S501). The CPU 301 scans ON pixels on the row of interest (step S502). At this time, when a portion having continuous ON pixels is present, the CPU 301 holds the upper right and upper left pixels of the ON pixel group in the work memory 406 of the RAM 303 shown in FIG. 4 as feature points (step S503). The CPU 301 also holds the coordinates of pixels circumscribing the pattern region as feature points.

The CPU 301 confirms whether feature points at the same coordinates were already held (step S504). If feature points at the same coordinates are present on a row next to the row of interest, and are not present as ON pixel positions on the row of interest (YES in step S504), the CPU 301 determines the rectangular region (step S505). In this case, the upper portions of the rectangle are set as feature points on the previous row, and the lower portions of the rectangle (the coordinates of the lower left and lower right pixels) are set as coordinates corresponding to feature points at the pixel positions on the row of interest. On the other hand, if feature points at the same coordinates are present (NO in step S504), the CPU 301 determines no feature points, and continues the process upon setting the next row as the row of interest (step S506).

Figure 27D:
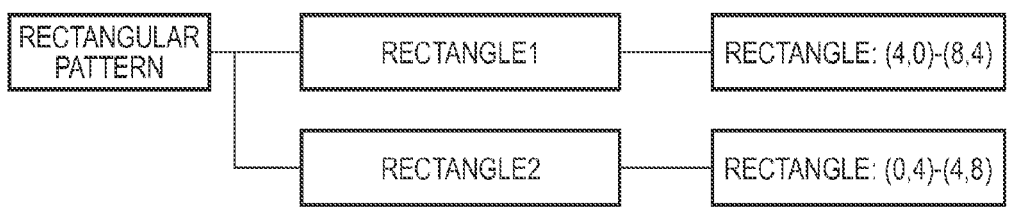

By performing the above-mentioned processing up to the last row in the pattern, rectangle rendering in the pattern region is determined. At this time, rectangular pattern information corresponding to a rendering command as shown in FIG. 27D is stored in the pattern management table 407 shown in FIG. 4. Note that the rectangular pattern information shown in FIG. 27D represents the upper left coordinates and the lower right coordinates.

(Path Replacement Processing)

Figure 14:
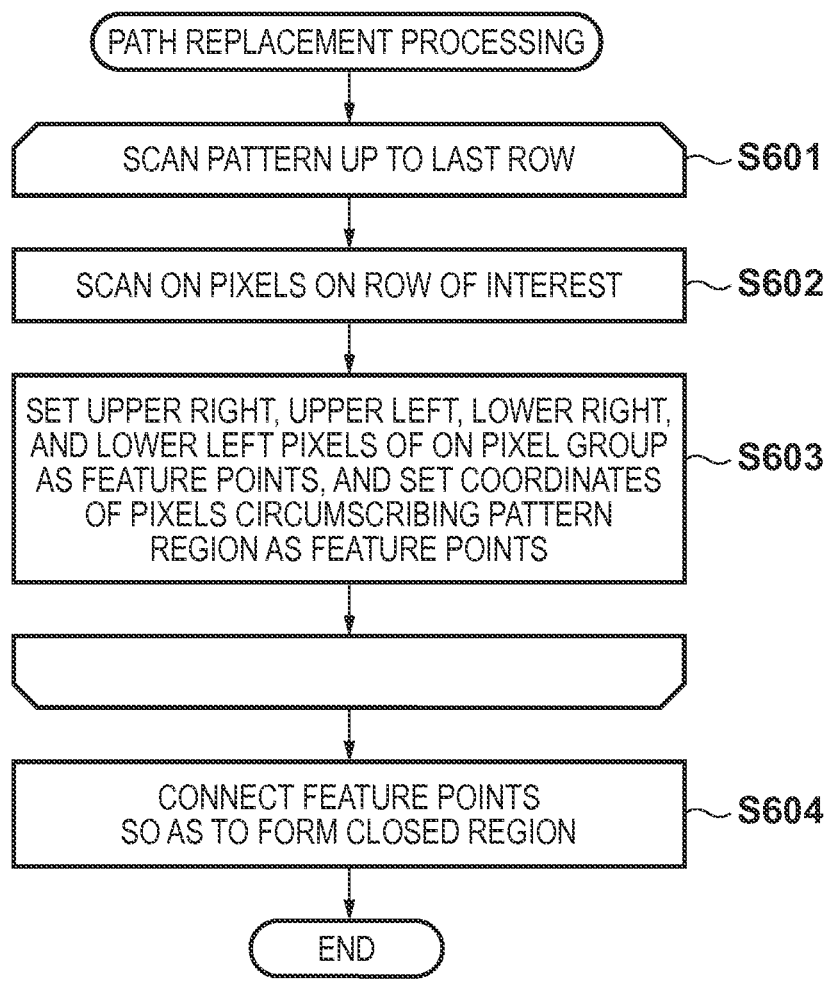
FIG. 14 is a flowchart of path replacement processing.

The path replacement processing in step S209 of FIG. 8 will be described in detail with reference to a flowchart shown in FIG. 14. FIG. 22A illustrates an example of input data of the sequence of this flowchart. FIGS. 22B and 22C show the results of processes in respective steps for input data obtained by this processing sequence.

The CPU 301 executes processes in steps S602 and S603 for each row in the pattern (step S601). First, the CPU 301 scans ON pixels on the row of interest (step S602). At this time, when ON pixels are present, the CPU 301 holds the vertices of ON pixel groups in the work memory 406 of the RAM 303 shown in FIG. 4 as feature points (step S603). With the above-mentioned processes, a result shown in FIG. 22B is obtained.

After scanning on each row, the CPU 301 generates a path rendering command so as to surround ON pixels using the detected feature points (step S604). In other words, the CPU 301 connects the feature points to each other so as to form closed regions to generate a rendering command indicating these closed regions. With the above-mentioned processes, a result shown in FIG. 22C is obtained.

With the above-mentioned processing (FIGS. 8 and 11 to 14), a rendering command designated in a bitmap pattern is replaced with a rendering command for a density pattern, a line pattern, a diagonal pattern, a rectangular pattern, or a path rendering pattern.

[Pattern Combination Processing]

Figure 15:
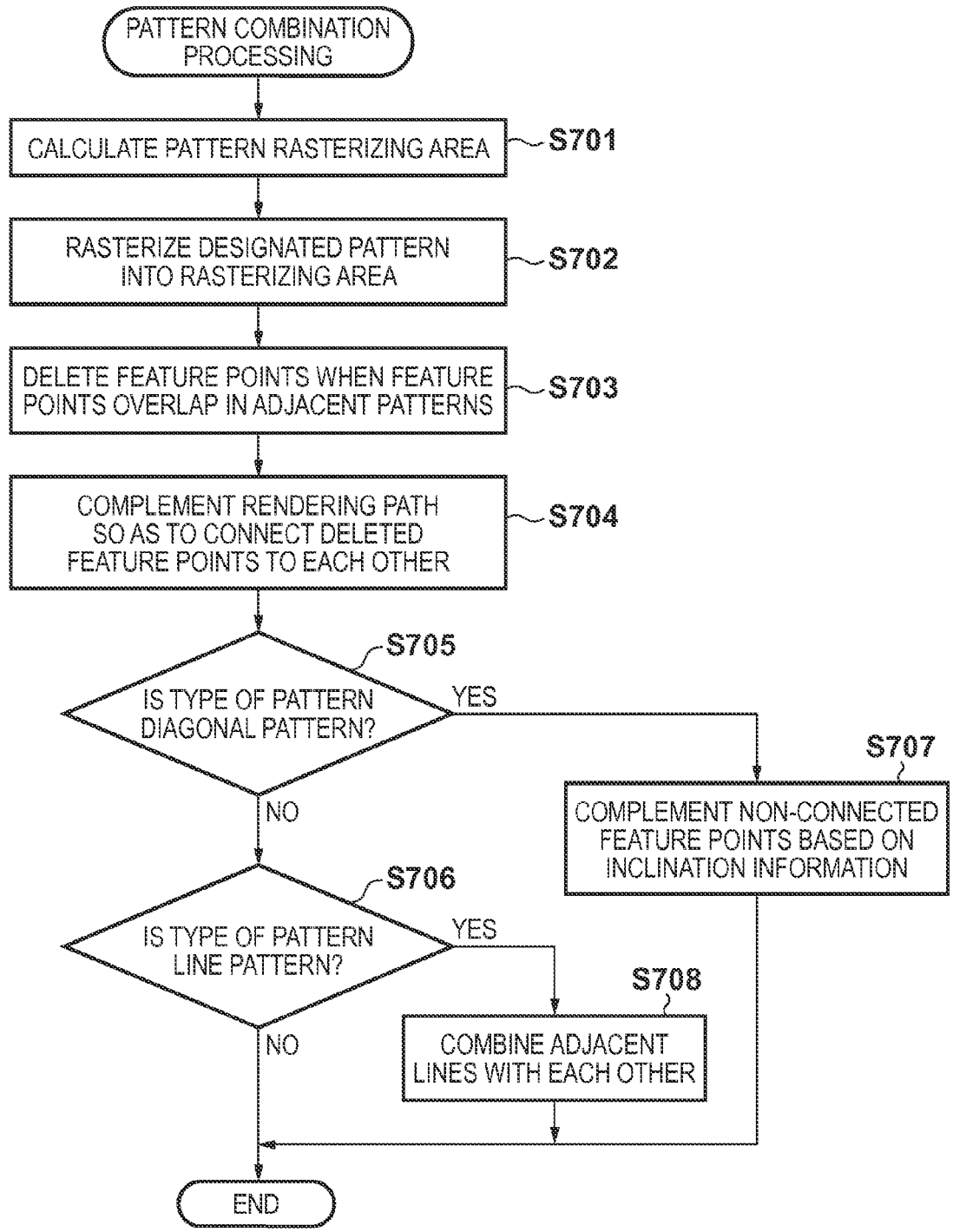
FIG. 15 is a flowchart of pattern combination processing.

The pattern combination processing will be described below with reference to a flowchart shown in FIG. 15 in step S104 of FIG. 7. A pattern combination processing program 404 which implements the sequence of the flowchart shown in FIG. 15 is stored in the ROM 302 of the printer 102, read out into the RAM 303, and executed by the CPU 301, as shown in FIG. 4.

With the various types of pattern replacement processing described above, the rendering command is replaced with a graphic rendering command in the region of a bitmap pattern having a predetermined pattern size included in print data. The pattern normally includes rendering pattern data and filling designation using this pattern, and processing of arranging a plurality of identical pattern data and rendering a predetermined pattern is performed. In this embodiment, in arranging a plurality of pattern rendering commands replaced with graphic rendering commands, and rendering a predetermined pattern, a graphic rendering command generated using an adjacent pattern region is further combined with these commands.

First, the CPU 301 calculates the rendering range (rendering area) of a rasterizing area in which patterns are arranged and rasterized based on print data, and calculates the number of patterns arranged in the rasterizing area (step S701). The patterns arranged and rasterized in the rasterizing area depends on the resolution, as exemplified by the arrangements of grid patterns shown in FIGS. 5A and 5B. Therefore, to remove the difference in pattern output result due to the difference between the monitor resolution and the printer output resolution, the pattern is converted into the printer output resolution using an output ratio calculation equation:

Output Ratio=Printer Resolution/Monitor Resolution

This indicates that to remove the difference in appearance of the output result due to the difference in resolution between patterns having characteristic pattern shapes, such as lines, diagonal lines, or grid patterns, processing of enlarging these patterns using the output ratio is performed. For example, when pattern data of 16 dots×16 dots is processed at an output ratio of 2, enlargement conversion processing which generates pattern data of 32 dots×32 dots is performed. Note that with this enlargement conversion processing, the pattern data held in the pattern management table 407 is also updated.

Note that the printer resolution is obtained from the information of the printer itself, and the monitor resolution is obtained using information included in print data. Also, the output ratio is not limited to an integer.

The CPU 301 reads and rasterizes the pattern data held in the pattern management table 407 of the RAM 303 shown in FIG. 4, based on the calculated number of patterns to be rasterized and the type of pattern to be rasterized (step S702).

The CPU 301 compares adjacent patterns in the rasterized feature information to delete overlapping feature points (coordinates) (step S703). More specifically, after patterns identical to one pattern shown in FIG. 23A are combined with each other as shown in FIG. 23B, the pieces of coordinate information of feature points corresponding to the pattern joints, which have been necessary in rendering this pattern, become unnecessary. Therefore, overlapping feature points are deleted by combining a plurality of patterns with each other.

The CPU 301 reconfigures a rendering command which constitutes the combined pattern so as to connect the deleted coordinates for feature points to each other (step S704). Note that a diagonal pattern or a line pattern requires additional combination processing, so the CPU 301 determines whether the pattern is a diagonal pattern (step S705). If it is determined in step S705 that the pattern is a diagonal pattern (YES in step S705), the CPU 301 complements the pattern based on the "inclination" information of the diagonal pattern for feature points which remain unconnected even after the combination processing (step S707). More specifically, a plurality of patterns shown in FIG. 24B are generated from an original pattern shown in FIG. 24A, and are combined with each other. In this case, as shown in FIG. 24C, if it is determined based on the feature information, that is, the inclination information of the diagonal pattern that unconnected feature points can be connected to each other, rendering is done to connect the feature points to each other.

Figure 25C:
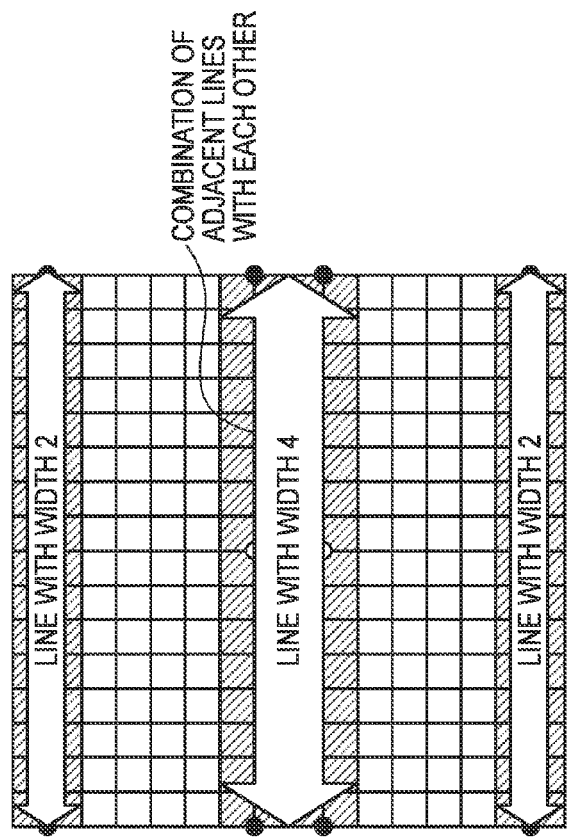
FIGS. 25A, 25B, and 25C are views for explaining patterns obtained in line pattern combination processing.
Figure 25B:
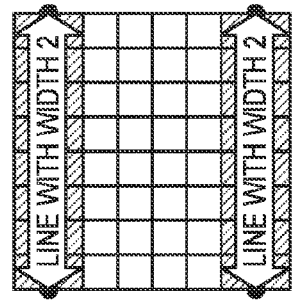
Figure 25A:
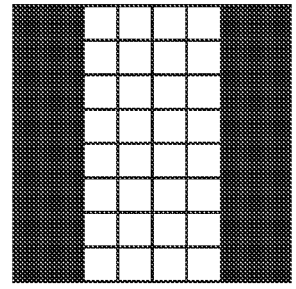

If it is determined in step S705 that the pattern is not a diagonal pattern (NO in step S705), the CPU 301 determines whether the pattern is a line pattern (step S706). If it is determined in step S706 that the pattern is a line pattern (YES in step S706), the CPU 301 executes processing of combining adjacent lines with each other (step S708). More specifically, a plurality of patterns shown in FIG. 25B are generated from an original pattern shown in FIG. 25A, and are combined with each other. In this case, as shown in FIG. 25C, if two lines can be combined by adjacent patterns, they are combined into one line.

[Pattern Optimization Processing]

Figure 16:
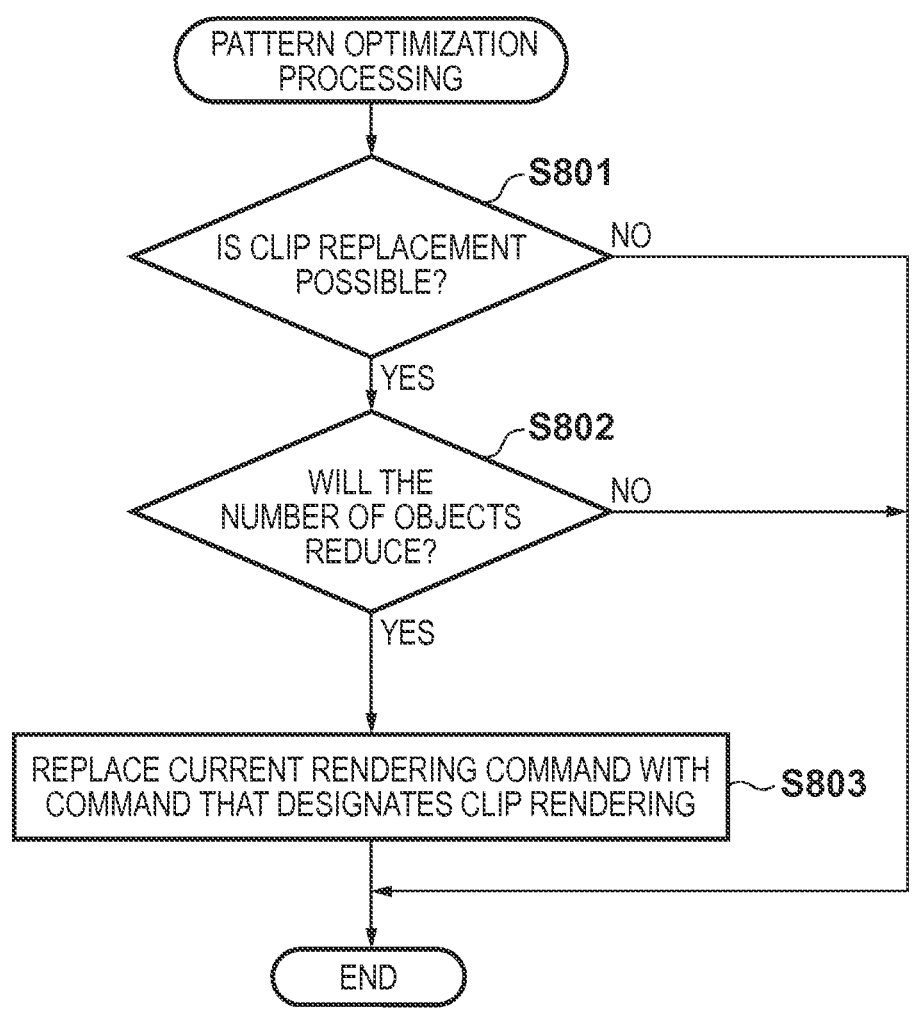
FIG. 16 is a flowchart of pattern optimization processing.

The pattern optimization processing in step S105 of FIG. 7 will be described lastly with reference to a flowchart shown in FIG. 16. A pattern optimization processing program 405 which implements the sequence of the flowchart shown in FIG. 16 is stored in the ROM 302 of the printer 102, read out into the RAM 303, and executed by the CPU 301, as shown in FIG. 4.

In the pattern optimization processing of this case, it is determined whether it is possible to improve the performance or reduce the amount of memory consumption upon rendering command replacement for the combined pattern rendering command group although the rendering result will remain the same (load determination). If it is determined that a reduction in processing load is possible, optimization is performed. In this embodiment, it is determined which of rendering according to a rendering command left intact as designated, and rendering according to a combination of a rendering command and a clip command is more efficient. With this optimization processing, the load on each resource of the apparatus can be reduced. Note that the clip command indicates a command to designate only part of an image and render only the designated part.

First, the CPU 301 determines whether clip rendering replacement is possible for the rendering command rasterized for pattern rendering (step S801). More specifically, the CPU 301 determines whether a portion represented by path rendering in diagonal pattern rendering can be replaced with line rendering and clip rendering. Note that it may be determined whether other patterns can be optimized by rendering command replacement. It may also be determined whether the pattern can be optimized using a rendering command other than a clip command.

If it is determined in step S801 that replacement is impossible (NO in step S801), this processing sequence ends. If it is determined in step S801 that replacement is possible (YES in step S801), the CPU 301 determines whether the number of objects to be rendered will reduce upon rendering command replacement (step S802).

If it is determined in step S802 that the number of objects will not reduce (NO in step S802), this processing sequence ends. If it is determined in step S802 that the number of objects will reduce (YES in step S802), the CPU 301 replaces the rendering command rasterized for pattern rendering with a rendering command which uses a clip command (step S803).

With the above-mentioned processing, a rendering command designated in a bitmap pattern is replaced with a rendering command for a density pattern, a line pattern, a diagonal pattern, a rectangular pattern, or a path rendering pattern.

Hence, a printer output result identical to a monitor output result can be obtained even when a pattern is rasterized and rendered upon scaling so as to remove the difference between the monitor and printer output resolutions. Also, upon replacement of a bitmap rendering command with a graphic rendering command, a high-quality output can be obtained even when output scaling processing is performed.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-269399, filed Dec. 8, 2011, which is hereby incorporated by reference herein in its entirety.

What is claimed is:

1. A rendering data processing apparatus comprising:
   a determination unit configured to determine objects of a bitmap pattern in rendering data;
   a specification unit configured to specify an object, for which a bitmap rendering command can be replaced with a graphic rendering command, among the determined objects of the bitmap pattern;
   a replacement unit configured to replace the bitmap rendering command for the object specified by said specification unit with the graphic rendering command; and
   a combination unit configured, in a case where a plurality of patterns designated by a plurality of graphic rendering commands replaced by said replacement unit are arranged adjacent to each other and rendered, to combine the plurality of graphic rendering commands corresponding to the plurality of patterns with each other.

2. The apparatus according to claim 1, further comprising:
   a load determination unit configured to determine whether a processing load reduces upon replacement of the graphic rendering command combined by said combination unit with another rendering command; and
   an optimization unit configured to replace the combined graphic rendering command with the other rendering command in a case where said load determination unit determines that the processing load reduces upon replacement with the other rendering command.

3. The apparatus according to claim 2, wherein the other rendering command includes a rendering command formed by a combination of a graphic rendering command and a clip command.

4. The apparatus according to claim 1, wherein said specification unit specifies one of a pattern representing filling, a line pattern, a pattern representing a diagonal line, and a rectangular pattern as the bitmap pattern.

5. The apparatus according to claim 4, wherein in a case where the bitmap pattern includes at least one of a row and a column on which all pixels serve only as one of ON pixels and OFF pixels, said specification unit specifies a line pattern as the bitmap pattern, and determines that replacement with a graphic rendering command that designates line rendering is possible.

6. The apparatus according to claim 4, wherein in a case where at least one of the total number of ON pixels and the total number of OFF pixels on at least one of each row and each column is constant in the bitmap pattern, said specification unit specifies a pattern representing a diagonal line as the bitmap pattern, and determines that replacement with a graphic rendering command that designates diagonal line rendering is possible.

7. The apparatus according to claim 4, wherein in a case where the adjacent patterns are patterns representing diagonal lines in combining the plurality of graphic rendering commands with each other, said combination unit combines the plurality of graphic rendering commands so as to combine adjacent diagonal lines into one diagonal line.

8. The apparatus according to claim 7, wherein in a case where the adjacent patterns are patterns representing diagonal lines in combining the plurality of graphic rendering commands with each other, said combination unit complements the patterns using inclination information of the diagonal lines.

9. The apparatus according to claim 4, wherein in a case where the adjacent patterns are line patterns in combining the plurality of graphic rendering commands with each other, said combination unit combines the plurality of graphic rendering commands so as to combine adjacent lines into one line.

10. A rendering data processing method comprising:
    determining objects of a bitmap pattern in rendering data;
    specifying an object, for which a bitmap rendering command can be replaced with a graphic rendering command, among the determined objects of the bitmap pattern;
    replacing the bitmap rendering command for the object specified in the specification step with the graphic rendering command; and
    combining, in a case where a plurality of patterns designated by a plurality of graphic rendering commands replaced in the replacement step are arranged adjacent to each other and rendered, the plurality of graphic rendering commands corresponding to the plurality of patterns with each other.

11. A non-transitory computer-readable medium storing a program for causing a computer to function as:
    a determination unit configured to determine objects of a bitmap pattern in rendering data;
    a specification unit configured to specify an object, for which a bitmap rendering command can be replaced with a graphic rendering command, among the determined objects of the bitmap pattern;

a replacement unit configured to replace the bitmap rendering command for the object specified by the specification unit with the graphic rendering command; and a combination unit configured, in a case where a plurality of patterns designated by a plurality of graphic rendering commands replaced by the replacement unit are arranged adjacent to each other and rendered, to combine the plurality of graphic rendering commands corresponding to the plurality of patterns with each other.

12. A print apparatus comprising:

a first determination unit configured to determine whether a rendering command included in print data is a pattern rendering command;

a second determination unit configured to determine a type of bitmap pattern, corresponding to the pattern rendering command, for the rendering command determined as the pattern rendering command by said first determination unit;

a processing unit configured to replace the bitmap pattern with a graphic rendering command for the pattern rendering command if said second determination unit determines that the bitmap pattern is not a density pattern, and not to replace the bitmap pattern with a graphic rendering command for the pattern rendering command if said second determination unit determines that the bitmap pattern is a density pattern; and a print unit configured to print the print data in accordance with the pattern rendering command processed by said processing unit.

13. A print method comprising:

a first determination step of determining whether a rendering command included in print data is a pattern rendering command;

a second determination step of determining a type of bitmap pattern, corresponding to the pattern rendering command, for the rendering command determined as the pattern rendering command in the first determination step;

a processing step of replacing the bitmap pattern with a graphic rendering command for the pattern rendering command if it is determined in the second determination step that the bitmap pattern is not a density pattern, and not replacing the bitmap pattern with a graphic rendering command for the pattern rendering command if it is determined in the second determination step that the bitmap pattern is a density pattern; and a print step of printing the print data in accordance with the pattern rendering command processed in the processing step.

* * * * *